United States Patent
Liu

(10) Patent No.: US 7,656,897 B2
(45) Date of Patent: *Feb. 2, 2010

(54) CPRI-BASED MULTIPROTOCOL SIGNAL TRANSMISSION METHOD AND APPARATUS IN DISTRIBUTED BASE STATION SYSTEM

(75) Inventor: Sheng Liu, Shenzheng (CN)

(73) Assignee: UTStarcom Telecom Co., Ltd., Hangzhou (CN)

( * ) Notice: Subject to any disclaimer, the term of this patent is extended or adjusted under 35 U.S.C. 154(b) by 535 days.

This patent is subject to a terminal disclaimer.

(21) Appl. No.: 11/397,949

(22) Filed: Apr. 3, 2006

(65) Prior Publication Data

US 2007/0091896 A1    Apr. 26, 2007

(30) Foreign Application Priority Data

Oct. 26, 2005    (CN) .......................... 2005 1 0114750

(51) Int. Cl.
H04J 3/16    (2006.01)
(52) U.S. Cl. ...................................... 370/467; 370/473
(58) Field of Classification Search ......... 370/464–466, 370/469, 473, 474
See application file for complete search history.

(56) References Cited

U.S. PATENT DOCUMENTS

| 5,758,287 | A | 5/1998 | Lee et al. ..................... 455/450 |
| 6,594,496 | B2 | 7/2003 | Schwartz ..................... 455/509 |
| 7,020,814 | B2 * | 3/2006 | Ryle et al. ................... 714/712 |
| 2004/0252720 | A1 * | 12/2004 | Xiong et al. ................. 370/473 |
| 2005/0105534 | A1 | 5/2005 | Osterling ............... 370/395.43 |
| 2005/0105552 | A1 | 5/2005 | Osterling .................... 370/466 |

FOREIGN PATENT DOCUMENTS

CN    1201348 A    12/1998

* cited by examiner

*Primary Examiner*—Ricky Ngo
*Assistant Examiner*—Gary Mui
(74) *Attorney, Agent, or Firm*—Seed IP Law Group PLLC

(57) ABSTRACT

The present invention provides a method for realizing transmission of multiprotocol client signals in a distributed base station subsystem, comprising: encapsulating client signals by a GFP-T frame; and mapping the GFP-T frame into a lower-layer transmission link to realize the transmission of client signals. The lower-layer transmission link is a common public radio interface CPRI link. The client signals are one of the following: baseband I/Q signals of WCDMA supported by CPRI protocol, baseband I/Q signals of radio interface protocols other than WCDMA, structured signals of E1/T1, STM-1 and other constant-rate links, structured variable-rate link signals such as Ethernet MAC frame signals, PPP/HDLC frame signals, etc. This method is also applicable to other types of synchronous transmission links between a remote radio unit and a primary baseband processing unit, e.g., the links as specified by OBSAI (Open Base Station Architecture Initiative).

27 Claims, 22 Drawing Sheets

| PTI = 000 | |
|---|---|
| UPI Value | GFP Frame payload |
| 0000, 0000 , 1111, 1111 | Remaining Un-used |
| 0000, 0001 | Frame Mapping Ethernet MAC |
| 0000, 0010 | Frame Mapping PPP |
| 0000, 0011 | Transparent Optical Fiber Channel |
| 0000, 0100 | Transparent FICON |
| 0000, 0101 | Transparent ESCON |
| 0000, 0110 | Transparent GB Ethernet |
| 0000, 0111 | Reserved |
| 0000, 1000 | Frame Mapping MAPOS |
| 0000, 1001 ~ 1110, 1111 | Reserved for Future Standard |
| 1111, 000 ~ 1111, 1110 | Reserved for Specific Usage |

Fig. 2a (Prior Art)

| PTI = 100 ||
|---|---|
| UPI Value | GFP Frame payload |
| 0000, 0000 , 1111, 1111 | Remaining Un-used |
| 0000, 0001 | Client Signal Failure ( to Lose Client Signals ) |
| 0000, 0010 | Client Signal Failure ( to Lose Client Character Synchronization ) |
| 0000, 0011 , 1111, 1110 | Reserved for Future Usage |

Fig. 2b

(Prior Art)

| Extension Header Identifier (EXI) value | usage |
|---|---|
| 0000 | no Extension Header Identifier |
| 0001 | Linear frame |
| 0010 | Circular frame |
| 0011~1111 | Reserved and un-defined |

Fig. 3

(Prior Art)

CPRI-BASED MULTIPROTOCOL SIGNAL TRANSMISSION METHOD AND APPARATUS IN DISTRIBUTED BASE STATION SYSTEM

CROSS-REFERENCE TO RELATED APPLICATION

This application claims the benefit of CN Patent Application No. 200510114750.2, filed on Oct. 26, 2005, which is incorporated by reference herein in its entirety.

FIELD OF THE INVENTION

The present invention relates to distributed base station technology in a mobile communication system, and particularly relates to a CPRI-based multiprotocol signal transmission method in a distributed base station system, and to an apparatus for implementing this method.

DESCRIPTION OF THE RELATED ART

1. Distributed Base Station and Common Public Radio Interface (CPRI)

In a mobile communication system, a radio access network typically consists of base transceivers (BTS) and a base station controller (BSC) for controlling a plurality of base transceivers or a radio network controller (RNC). As shown in FIG. 1(a), a base transceiver mainly comprises a baseband processing subsystem, a RF subsystem and antennas, etc. and is responsible for performing transmission, reception and processing of radio signals. A base station can cover different cells via a plurality of antennas, as shown in FIG. 1(b).

In a mobile communication system, there exists a problem relating to radio network coverage, such as indoor coverage in a high-rise building and coverage of blind areas or shaded regions, which problem is hard to be solved using the conventional base station technology. The RRU technology is just an effective solution proposed in view of the above-mentioned problem. In the distributed base station system using the RRU, the main RF unit and the antennas are mounted at an area where coverage is required and are connected to a primary baseband processing unit of the base station via a wideband transmission line, wherein the wideband transmission line for connecting a remote radio unit and a primary baseband processing unit typically uses transmission media such as optical fiber, copper cable and microwave, etc.

Radio signal transmission between a remote radio unit and a primary baseband processing unit can adopt both an analog signal transmission scheme and a digital signal transmission scheme. It is easier to realize the radio signal transmission by adopting the analog signal transmission scheme, but noise and other disturbing components are inevitably mixed in the analog line and signal modulation in the transmission also causes non-linear distortion. Therefore, the transmission distance between the remote radio unit and the primary baseband processing unit is restricted, usually within the range of several hundred meters; besides, the analogy signal transmission is not convenient for the implementation of the multiplexing technology and the utility of the transmission line is low. Thus, the common public radio interface (CPRI) standardizes an interface between the remote radio unit and the primary baseband processing unit in view of the typical architecture of a distributed base station and on the basis of the digital signal transmission technique. At present, many commercial distributed base station systems based on this standard have been developed.

In the CPRI specification, the terms "RE" (Radio Equipment) and "REC" (Radio Equipment Controller) correspond respectively to the remote radio unit and the primary baseband processing unit, and the interface between the RE and the REC is a CPRI link. In the CPRI protocol stack architecture as shown in FIG. 5, a user plane is responsible for transmitting baseband I/Q data, while a control and management plane mainly comprises inband signalling having higher real-time requirement, and layer 3 protocol data (undefined by the CPRI) born on layer 2 protocol HDLC (High-level Data Link Control) and Ethernet. Data, including user plane data, control and management plane data, synchronization data and manufacturer's specified data, are all multiplexed on an electrical or optical transmission line in a time division multiplexing mode.

The CPRI is essentially a synchronous transmission link based on a certain frame structure, and the length of a basic frame thereof is the width of a WCDMA chip, i.e., 1/3.84 MHZ=260.416667 ns. A basic frame consists of 16 words with numbers W=0 . . . 15, wherein the word with the number W=0 is a control word for transmission control and management of plane data, synchronization data and other information, and the remaining words are used for transmitting I/Q data. At present, the CPRI has totally defined 3 line rates, i.e., 614.4 Mbit/s, 1228.8 Mbit/s (2×614.4 Mbit/s) and 2457.6 Mbit/s (2×1228.8 Mbit/s), and the frame structure of the CPRI for every rate is the same, but the word length of the corresponding basic frame is different, and the word lengths are 8, 16, 32 bits or 1, 2, 4 bytes, respectively. A physical line of the CPRI uses 8B/10B line coding, and as shown in FIG. 6, the CPRI link with a rate of 614.4 Mbit/s has an information rate of 491.52 Mbit/s before line coding whereas it has a line rate of 614.4 Mbit/s after the 8B/10B line coding.

Based on a basic frame, every 256 basic frames further constitute a hyperframe, and 150 hyperframes correspond to a UMTS physical frame having a length of 10 ms. In the CPRI specification, for convenient denotation, Z (Z=0 . . . 149) is used to represent the hyperframe number of a corresponding hyperframe in a UMTS physical frame having a length of 10 ms, X (X=0 . . . 255) is used to represent the frame number of a corresponding basic frame in a hyperframe, W (W=0 . . . 15) is used to represent the number of a corresponding word in a basic frame, Y (Y=0 . . . 3) is used to represent the number of a corresponding byte of one word consisting of a basic frame, and B (B=0 . . . 31) is used to represent the number of a corresponding bit of one word consisting of a basic frame.

According to the CPRI specification, I/Q data is mapped into a basic frame with an AxC container as unit. One AxC container contains I/Q sample data in a UMTS chip for one carrier frequency of an antenna, while a basic frame may contain a plurality of AxC containers. Thus, a CPRI link can simultaneously bear I/Q sample data for a plurality of carrier frequencies of a plurality of antennas. An AxC container can be mapped into a basic frame by using two modes: packed position and flexible position. As shown in FIG. 7, the packed position mode indicates that AxC containers are consecutively in order mapped into a basic frame and the remaining bits are reserved bits, while the flexible position mode indicates the AxC containers are mapped into a basic frame according to a position specified in the application and the remaining bits unoccupied by the AxC containers in the frame are reserved bits.

2. Generic Framing Procedure (GFP)

A generic framing procedure (GFP) is a new technique jointly recommended by ITU-T and ANSI for adapting a data flow of block codes or packet type to a continuous byte synchronous transmission channel typically such as SDH (Synchronous Digital Hierarchy), OTN (Optical Transport Network), etc. Standard G.7041 of IUT-T or Standard T1X1.5/2000-024R3 of ANSI can be consulted for the detailed technical specification of the GFP. The GFP can be divided into frame-mapped GFP (GFP-F) supporting PDU (Protocol Data Unit) type and transparent GFP (GFP-T) supporting block code type, wherein the GFP-F can be used for the adaptation of IP/PPP, MPLS and Ethernet MAC and other protocol packets, and the GFP-T is used directly for adapting a block-coded character stream of Gigabit Ethernet and other lines and thus can satisfy some applications having small time delay requirements, but the GFP-T has lower transmission bandwidth utility compared with the GFP-F.

One GFP frame consists of a core header and a payload portion, wherein the payload portion further comprises a payload header, a payload and an optional payload FCS (Frame Check Sequence). The core header comprises a PLI field indicative of payload length and a core header error control cHEC field. Besides the function of providing the core header with error code protection, the cHEC further has a GFP frame delimitation function similar to ATM cell delimitation. The function of the payload header is to indicate the type of the payload and is provided with the error code protection by the tHEC, wherein a payload type identifier (PTI) "000" indicates the GFP frame bears user data and the PTI "100" indicates the GFP frame bears client management information. A payload FCS indicator (PFI) is used to indicate the presence of a payload FCS, and a user payload identifier (UPI) and a PTI are used to indicate the type of user data or client management information in the payload, as shown in FIG. 2. Moreover, an Extension Header Identifier (EXI) indicates the presence of an optional extension header and the type thereof. At present, one typical application of the extension header is to provide a Channel Identifier (CID) so as to support the multiplexing of a plurality of independent client signals. FIG. 3 shows a GFP extension header identifier which has been defined in the current standard, wherein EXI="0000" represents there is no extension header, and EXI="0001" and EXI="0010" are used for the applications of logical point-to-point (linearity) and logical ring links. When EXI="0001", the definitions of the extension header made by ITU-T and ANSI are slightly different, wherein ITU-T defines a one-byte Channel Identifier (CID) to support the multiplexing of at most 256 independent client signals, while in the standard of the ANSI, 4 most significant bits of the byte indicate a destination port and 4 least significant bits indicate a source port. Although defined in a different way, the extension header defined by ANSI has the same function and essence as that of being defined by ITU-T.

The transparent GFP (GFP-T) is specifically designed in view of client signals coded by adopting directly the 8B/10B line. As shown in FIG. 4, a payload of a GFP-T frame consists of a Superblock formed in sequence by 64B/65B code blocks with a fixed length, and the 64B/65B code blocks contain user data characters and control characters (including padding characters). Therefore, a flag bit is used to indicate whether the 64B/65B code blocks contain control characters, wherein 4 most significant bits of a control character are used for indicating subsequent control characters and identifying the position of a control code in the original 8B/10B code stream, while 4 least significant bits are used for transmitting the control code itself.

3. Problems Existing in Prior Art Relating to CPRI

The CPRI, as a common interface standard between a remote radio unit and a primary baseband processing unit in a distributed base station system, has been widely used by the industry concerned. However, the CPRI is presented directly aiming for the radio interface standard of WCDMA (wideband code division multiple access) of the UMTS (universal mobile communication system), and its specification only supports WCDMA at present. As to the radio interface standards other than WCDMA, typically such as CDMA 2000, CDMA One (IS-95), TD-CDMA, TD-SCDMA, GSM, WiMAX etc., the CPRI is not applicable.

In view of this problem, U.S patent application US2005/0105534A1, entitled "Encapsulation of diverse protocol over internal interface of distributed radio base station", sets forth a method of using CPRI to bear other radio interface protocols. The essence of this method is to adapt I/Q data rate of other radio interface protocols to a link rate of the CPRI by using multiplexing and fixed-position padding, so as to use the CPRI to bear I/Q sampling data of the radio interface protocols. Take a three carrier-frequency CDMA2000 1X as an example, its chip rate is 1.2288 Mcps, the ratio of which to the chip rate of the UMTS is 8:25. Thus, 24 basic frames of every 25 CPRI basic frames can be used to transmit I/Q data of the three carrier-frequency CDMA2000 1X, and the I/Q data portion of the remaining one basic frame is replaced with padding, as shown in FIG. 8.

Another U.S. patent application US2005/0105552A1, entitled "Encapsulation of independent transmissions over internal interface of distributed radio base station" and submitted with the aforesaid patent application at the same time, sets forth a technique of, based on CPRI, bearing signals of non-radio interface protocols such as E1, STM-1, Ethernet, PPP/HDLC, with the method similar to that in US2005/0105534A1. FIG. 9 shows a typical application of this technique, namely, the case where WCDMA and GSM Mini-BTS are co-located. Since WCDMA and GSM Mini-BTS are approximate in terms of volume, operating environment and other aspects, it is possible to co-locate them so as to reduce network construction costs. The connection between the GSM Mini-BTS and a GSM network includes an Abis interface using E1 as a physical link, and a local management interface using 10M Ethernet as an interface. Thus, by means of the above-mentioned techniques, the CPRI link can be used to simultaneously bear CPRI interface signals of WCDMA RE and E1, 10M Ethernet and other links used in the GSM Mini-BTS.

The solutions set forth in the above-mentioned U.S patent applications can be used to realize, using the CPRI link, the transmission of I/Q data of other radio interface protocols and signals of non-radio interface protocols such as E1, STM-1, etc., but these two solutions still have the following problems:

The solutions use multiplexing and fixed-position padding to realize the rate match of client signals (including I/Q signals of other radio interface protocols and signals of non-radiointerface protocols such as E1, STM-1, Ethernet, PPP/HDLC, etc.) other than WCDMA baseband signals. However, various complex client signal transmission combinations (including signal type, amount of signals of each type, number of carrier frequency, and signal bandwidth, etc.) may occur in practical application. Thus, based on these solutions, the multiplexing and fixed-position padding solutions have to be correspondingly designed in light of every possible combination. Due to the complicated changes of the practical application situation, standardization cannot be realized based on these solutions, so that many problems are caused in practical application;

when various client signals exist and the rate of the client signals does not have a simple proportional relation with the CPRI line rate (or WCDMA chip rate), the design and realization of the fixed-position padding become very complicated;

when it is necessary to transmit signals of Ethernet, PPP/HDLC and other non-constant rate link signals, it is difficult to implement the fixed-position padding according to these solutions, due to the rate variation of client signals; and Frame timing information of WCDMA can be extracted from the CPRI link, but when non-structured client signals (i.e., signals without a frame structure, such as radio interface I/Q sample data) are transmitted using the above solutions, the above patents have not provided a method of extracting and restoring frame timing information of client signals.

BRIEF SUMMARY OF THE INVENTION

According to what is above-stated, the current CPRI standard is only applicable to the WCDMA radio interface technology, whereas the existing technique of using the CPRI for the transmission of other client signals (including I/Q signals of other radio interface protocols and signals of E1, STM-1, Ethernet and other transmission lines) still has some irrational points. The present invention sets forth an effective workable method in view of this problem.

According to the present invention, all the client signals (including I/Q signals of other radio interface protocols and signals of E1, STM-1, Ethernet and other transmission lines) to be transmitted via a CPRI link are first encapsulated in a GFP-T frame and then the GFP-T frame is mapped into a CPRI frame so as to realize the object of using the CPRI link to transmit the corresponding client signals. Note that, the CPRI link acts as a transmission link in the present invention, but the method set forth in the present invention in which a GFP-T frame first encapsulates clients signals including I/Q signals of other radio interface protocols and signals of E1, STM-1, Ethernet and other transmission lines and then said GFP-T frame is mapped into a low-layer transmission link, is also applicable to other types of synchronous transmission links between a remote radio unit and a primary baseband processing unit, such as links specified in OBSAI (Open Base Station Architecture Initiative), etc.

Generally speaking, a first aspect of the present invention provides a method of realizing multiprotocol client signal transmission in a distributed base station subsystem of a radio mobile communication system, comprising the steps of:

encapsulating client signals by a GFP-T frame;

and mapping said GFP-T frame into a lower-layer transmission link to realize the transmission of client signals.

In a preferred embodiment, the lower-layer transmission link is a common public radio interface CPRI link.

A second aspect of the present invention provides a transmitting terminal equipment for realizing transmission of multiprotocol client signals in a distributed base station subsystem of a radio mobile communication system, comprising:

GFP-T framing and encapsulating unit for forming the client signals to be transmitted into a GFP-T frame according to the above method of the present invention; and CPRI mapping unit for mapping said each received GFP-T frame into a specific position of a CPRI frame according to the above method of the present invention, so as to realize multiprotocol transmission.

A third aspect of the present invention provides a receiving terminal equipment for realizing transmission of multiprotocol client signals in a distributed base station subsystem of a radio mobile communication system, comprising:

CPRI frame processing unit for processing a CPRI frame to separate I/Q signals of WCDMA, CPRI control, management and synchronization data and GFP-T frame signal flows;

GFP-T frame processing and de-multiplexing unit for processing a GFP-T frame and separating signal flows of respective GFP-T channels;

64B/65B decoding unit for extracting respective paths of client signals from the 64B/65B code blocks in the respective GFP-T channels; and I/Q data frame de-multiplexing unit for separating I/Q signal flows of respective antenna carriers from signal flows of a radio interface protocol, the corresponding radio frame synchronization and other information being extracted from corresponding GFP-T frame.

A forth aspect of the present invention provides an apparatus for realizing transmission of multiprotocol client signals in a distributed base station subsystem in a radio mobile communication system, comprising the above transmitting terminal equipment the above receiving terminal equipment according to the present invention.

A fifth aspect of the present invention provides a software product, comprising machine readable instructions, wherein said instructions can perform the above method according to the present invention.

A sixth aspect of the present invention provides a storage medium, comprising machine readable instructions stored thereon, wherein said instructions can perform the above method according to the present invention.

BRIEF DESCRIPTION OF THE DRAWINGS

The embodiments of the present invention will be further described in detail with reference to the drawings, and the object, characteristics and beneficial effects of the present invention will become clearer. In the accompanying drawings:

FIGS. 2(a)-2(b) are schematic views of a user payload identifier (UPI) value in a GFP frame payload header and a user data type in a GFP frame payload;

FIG. 3 is a schematic view of the definition of GFP Extension Header Identifier;

FIG. 20($b$) is a schematic view showing the structure of a receiving terminal system for performing client signal reception using the method of transmitting multiprotocol client signals in a distributed base station subsystem of the present invention.

DETAILED DESCRIPTION

Figure 1B:
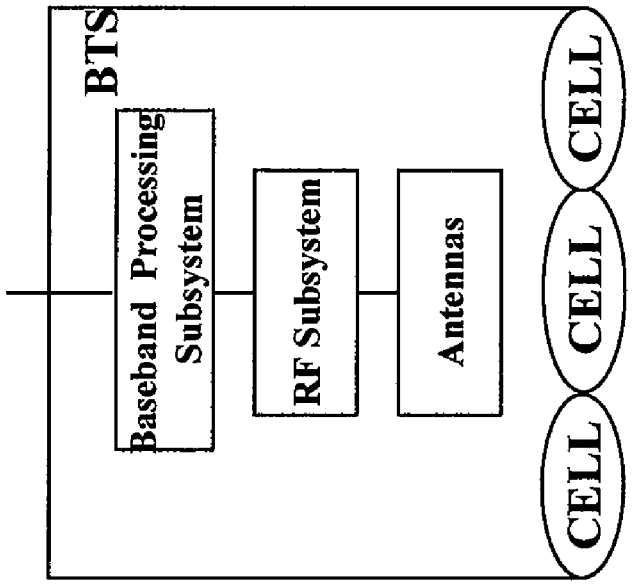
FIG. 1(b) is a schematic view of a conventional base station architecture.
Figure 1A:
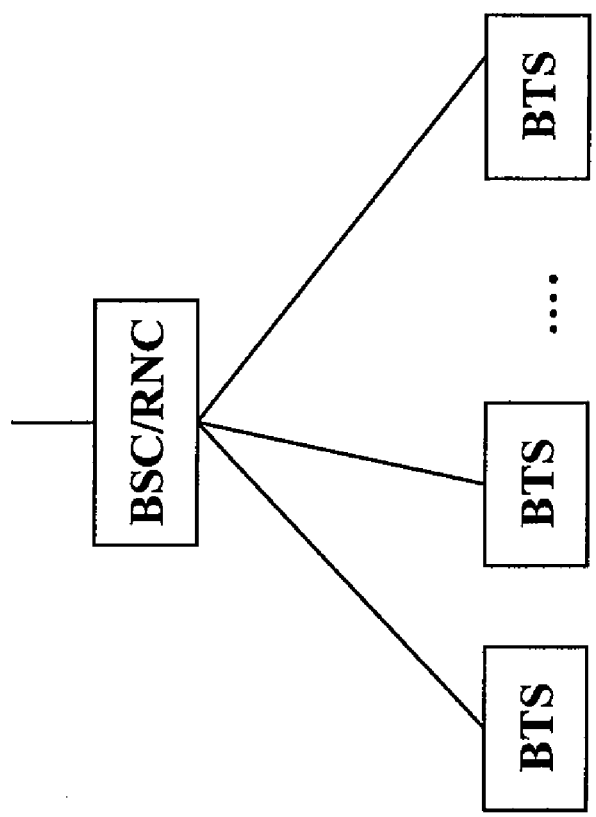
FIG. 1(a) is a schematic view of a radio access network architecture.
Figure 4:
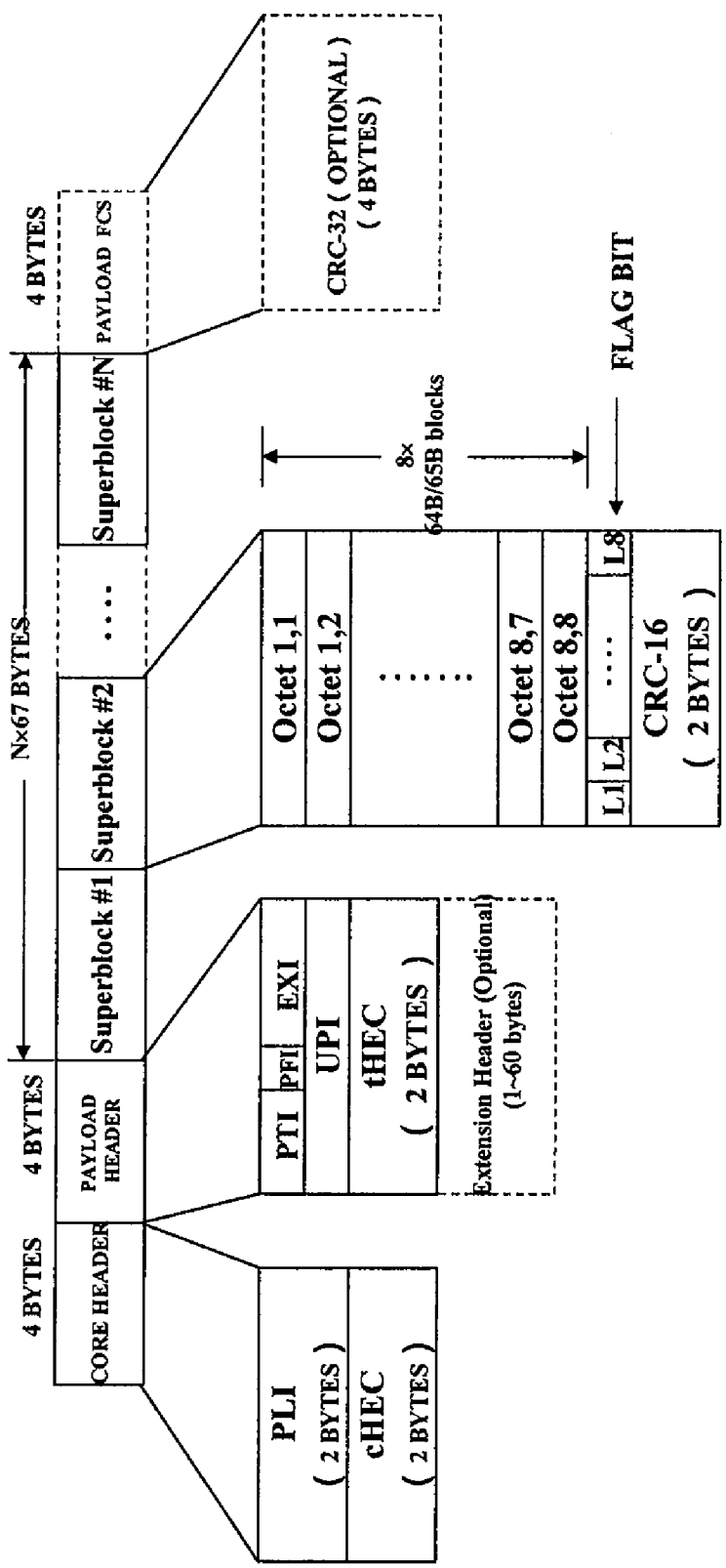
FIG. 4 is a schematic view of a GFP-T frame structure.
Figure 5:
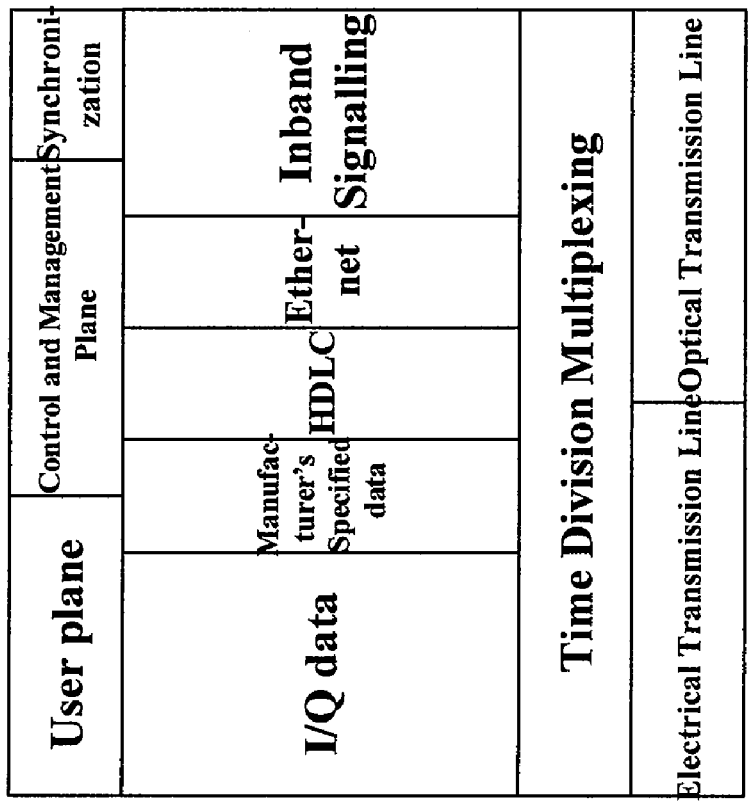
FIG. 5 is a schematic view of a CPRI protocol structure.
Figure 6:
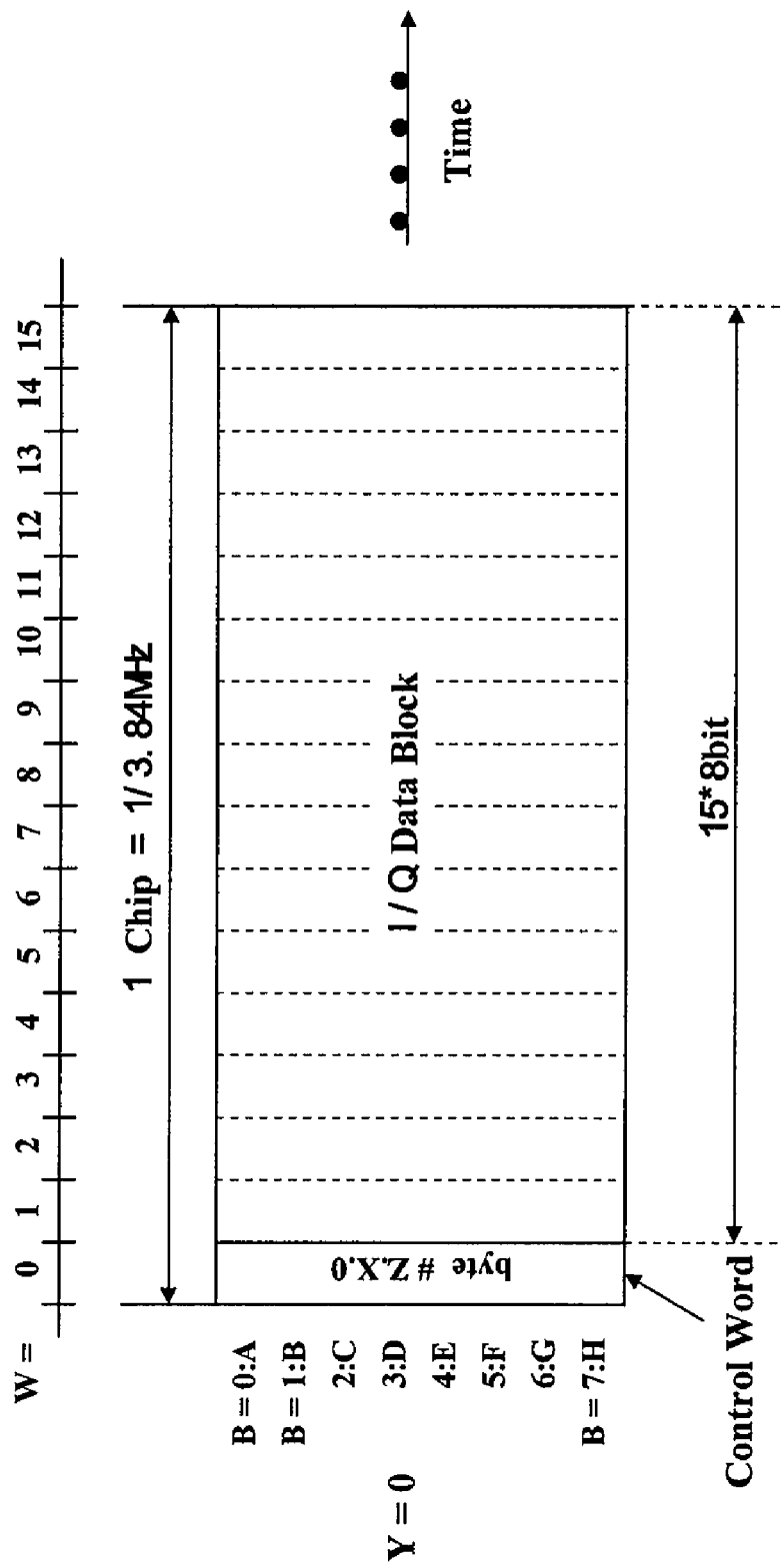
FIG. 6 is a schematic view of a frame structure of a CPRI link at a line rate of 614.4 Mbit/s.

In the present invention, other than WCDMA I/Q baseband signals supported by the prior CPRI protocol, the remaining client signals to be transmitted via a CPRI link can be divided into three types: one type involves baseband I/Q signals of CDMA2000, WiMAX, GSM and other radio interface protocols, and this type of signals are non-structured client signals, which is characterized in that this type of signals have a constant rate and have no frame structure and in that the transmission protocols are necessary to provide multiplexing of baseband I/Q signals of different antennas for different carrier frequencies and to provide frame timing information in correspondence with radio interface protocols, including radio frame start-up and base station frame number, etc. Meanwhile, as to the radio systems using the multi-antenna technique (e.g., transmitting diversity, receiving diversity, multi-antenna transmitting/receiving (MIMO), and intelligent antennas or antenna array, etc.), a strict time and phase relation exists between respective antenna signals, which requires the transmission time delay of respective antenna signals to be completely the same in the transmission process; the second type involves structured signals of constant-rate links such as E1/T1 and STM-1, etc., this type of signals having a constant rate and a specified frame structure which carries frame timing information of the corresponding link, and when it is necessary to transmit a plurality of this type of signal links, the transmission protocols are necessary to provide multiplexing function; and the third type involves structured variable rate link signals such as Ethernet MAC frame signals, PPP/HDLC frame signals, etc., this type of signals having a specified frame structure and a non-constant rate, and when it is necessary to transmit a plurality of this type of signal links, multiplexing function are necessary to be provide for the transmission protocols of signals without the multiplexing ability such as PPP/HDLC frame signals.

1. Multiplexing Solution of Client Signals 1.1 GFP-T Frame-Level Multiplexing Solution of Baseband I/Q Signals of a Radio Interface Protocol According to a first preferred solution of GFP-T frame-level multiplexing of baseband I/Q signals, the baseband I/Q signals of different antennas, of different carrier frequencies, and of the same type of radio interface protocols are multiplexed using a time division multiplexing mode and then encapsulated in the same GFP-T frame, and a GFP-T channel bearing baseband I/Q signals of different types of radio interface protocols is GFP-T frame-level multiplexed and then mapped into the same position of a CPRI frame to realize multiprotocol transmission. This preferred solution is particularly applicable to narrow-band mobile communication systems such as GSM, and PHS, etc. In this type of systems, the number of carrier frequencies is large, but the baseband I/Q signal bandwidth (rate) for each carrier frequency is small. Hence, this preferred solution is particularly applicable to the above-mentioned type of systems.

Figure 10:
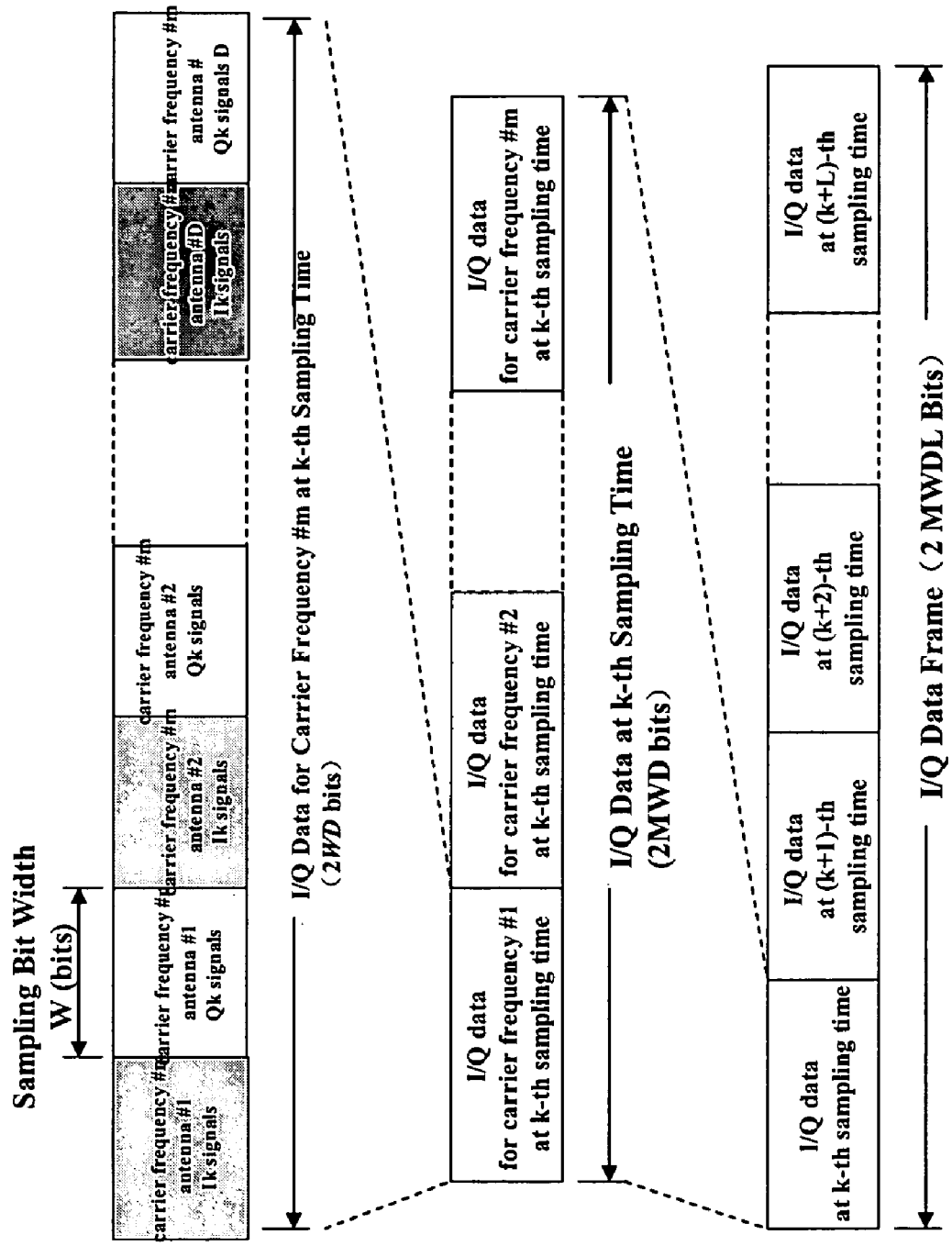
FIG. 10 is a schematic view showing a first I/Q data frame format in a first preferred solution of the GFP-T frame-level multiplexing of baseband I/Q signals of a radio interface protocol according to the present invention.

FIG. 10 further shows a preferred embodiment of an I/Q data frame format in the above-mentioned solution. First, I/Q baseband signals for a carrier frequency #m (m=1, 2, ... M) from respective antennas are arranged successively at the same sampling time, wherein the arrangement sequence of I/Q baseband signal sampling values of respective antennas is the same as the arrangement sequence of spatial position of antenna arrays or antenna groups, the I/Q baseband signal sampling values of the same antenna are successively arranged based on quadrature component sampling values and in-phase component sampling values, and consequently the I/Q data length bit for said carrier frequency at one sampling time is 2WD bits; then, M number of I/Q data at the same sampling time for M number of carrier frequencies are successively arranged and form a data block having a length of 2MWD bits; and finally, L number of such data blocks are successively arranged according to a sampling time increment to form an I/Q data frame, so the total bit length is 2MWDL. Since the GFP-T framing is performed in a byte alignment mode, L is a minimum value making MWDL/4 an integer. For example, when the number D of antenna of one RRU (remote RF unit) is D=2, the sampling bit width W=11 and the number of the carrier frequency is M=3, then L=2 is taken and I/Q data frame length thereof is 33 bytes.

According to a second preferred solution of GFP-T frame-level multiplexing of baseband I/Q signals, the baseband I/Q signals of the same carrier frequency, of different antennas, and of the same type of radio interface protocols are multiplexed using a time division multiplexing mode and encapsulated in the same GFP-T frame, and a GFP-T channel bearing baseband I/Q signals of different carrier frequencies and of different types of radio interface protocols is GFP-T frame-level multiplexed and then mapped into the same position of a CPRI frame to realize multiprotocol transmission. The advantage of this preferred solution lies in that some radio interface protocols may use different bandwidths at different carrier frequencies, and for example, in WiMAX system, 1.25 MHz bandwidth may be used at one frequency, while a 5 MHz bandwidth is used at another frequency. Since signals of different carrier frequencies have different bandwidths, the second preferred solution is more applicable.

Figure 11:
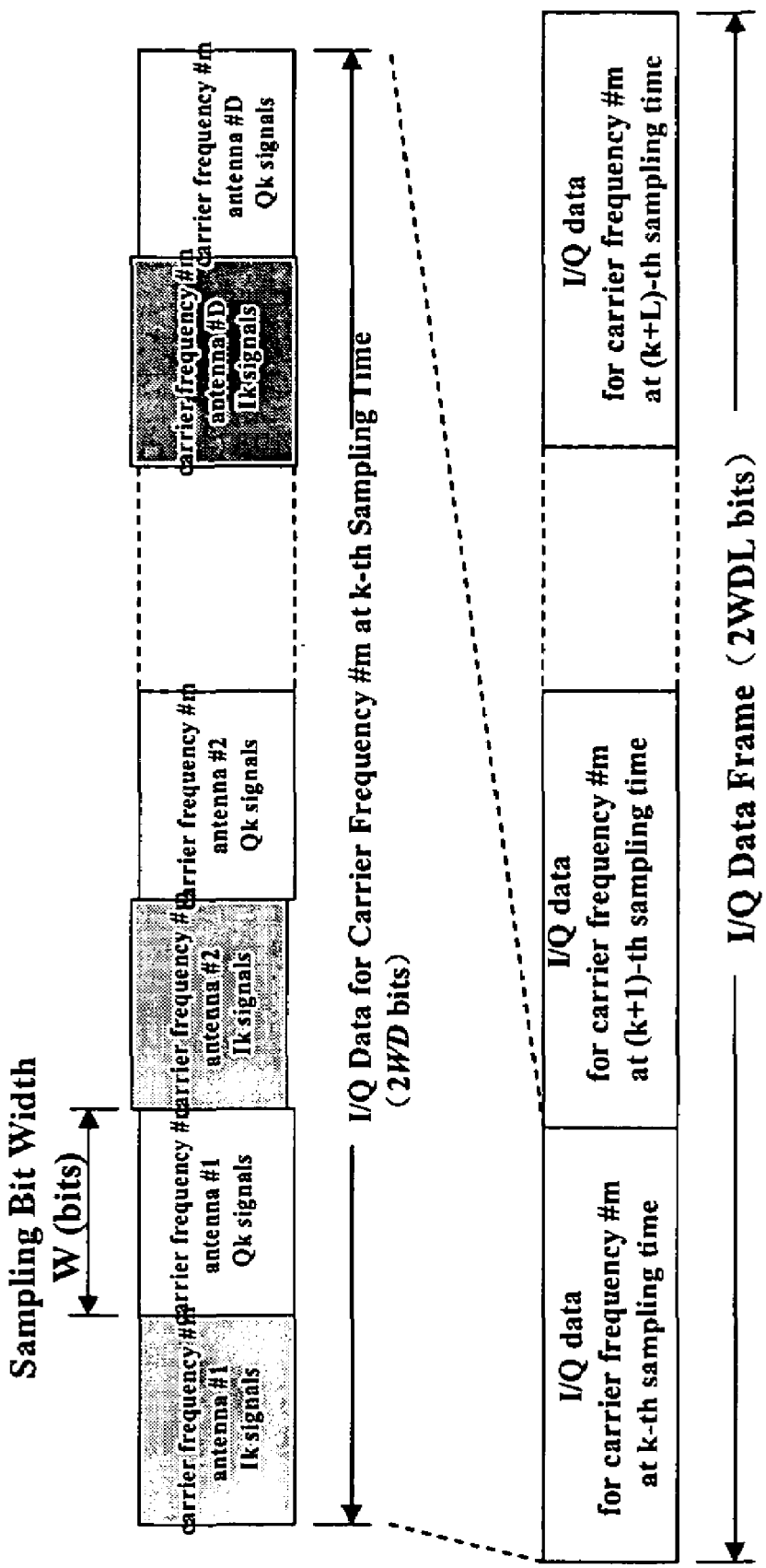
FIG. 11 is a schematic view showing a second I/Q data frame format in a second preferred solution of the GFP-T frame-level multiplexing of baseband I/Q signals of a radio interface protocol according to the present invention.

FIG. 11 further shows a preferred embodiment of an I/Q data frame format in the above-mentioned solution. First, I/Q baseband signals of a carrier frequency #m (m=1, 2, ... M) from respective antennas are arranged successively at the same sampling time, wherein the arrangement sequence of I/Q baseband signal sampling values of respective antennas is the same as the arrangement sequence of spatial position of antenna arrays or antenna groups, and the I/Q baseband signal sampling values of the same antenna are successively arranged based on quadrature component sampling values and in-phase component sampling values. Hence, if the number of the antennas is D and the sampling bit width is W (typically being 4~20), then the I/Q data length of said carrier frequency at one sampling time is 2WD bits. One I/Q data frame consists of L number of I/Q data for said carrier frequency successively arranged according to a sampling time increment, so the total bit length is 2WDL. Since the GFP-T framing is performed in a byte alignment mode, the bit length of one I/Q data frame should be the multiple of 8, i.e., the bit length thereof should be WDL/4 bits. Meanwhile, an I/Q data frame should be as short as possible so as to decrease an inherent time delay caused in the framing process. Since the sampling bit width and the number of the antenna are fixed, L becomes a minimum value making WDL/4 an integer. For example, if the number of the antenna of one RRU (remote RF unit) is D=2 and the sampling bit width W=11, then L=2 is taken and I/Q data frame length thereof is 11 bytes.

According to a third preferred solution of GFP-T frame-level multiplexing of baseband I/Q signals in the present invention, the baseband I/Q signals of the same carrier frequency, of the same antenna, and of the same type of radio interface protocols are first respectively encapsulated into the same GFP-T frame, and a GFP-T channel bearing the baseband I/Q signals for different carrier frequencies, different antennas, and different types of radio interface protocols are GFP-T frame-level multiplexed and then mapped into the same position of a CPRI frame to realize multiprotocol transmission.

Figure 12:
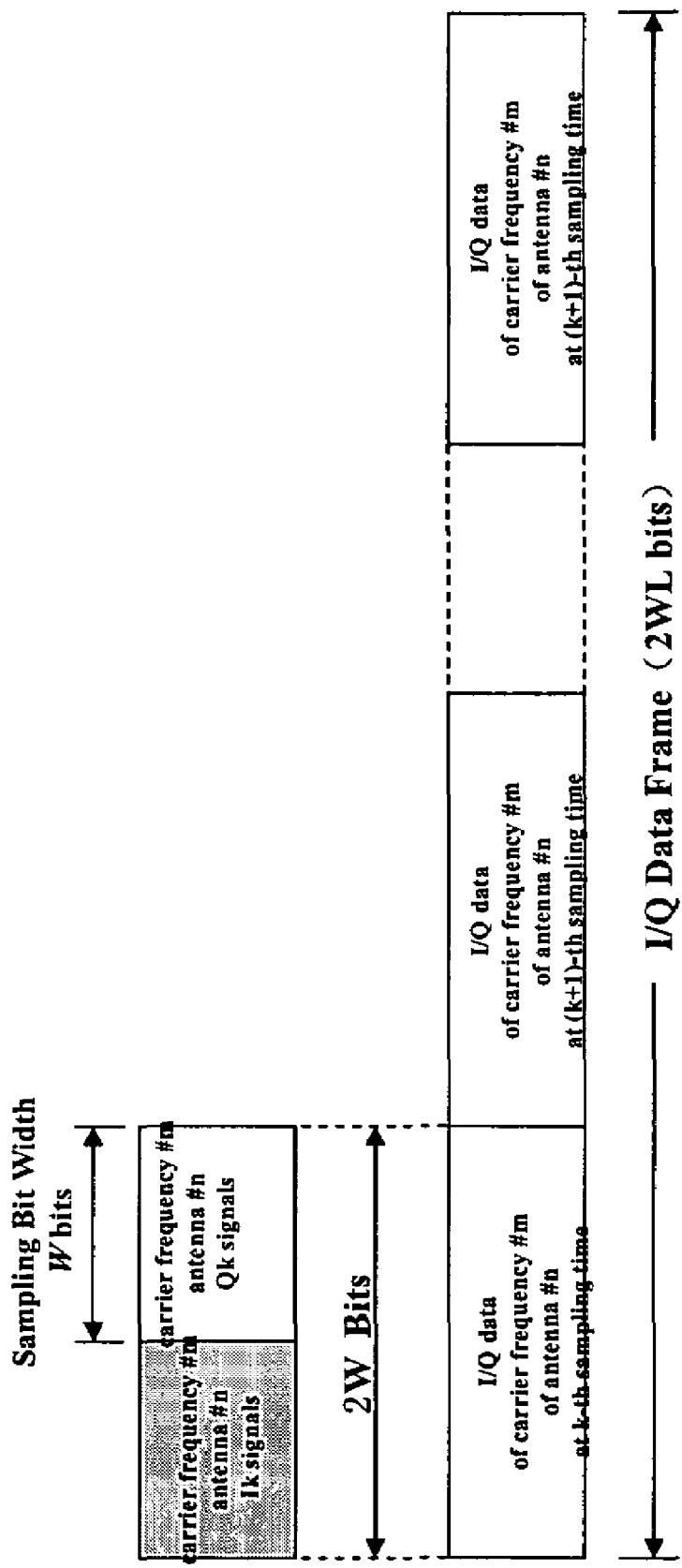
FIG. 12 is a schematic view showing a third I/Q data frame format in a third preferred solution of the GFP-T frame-level multiplexing of baseband I/Q signals of a radio interface protocol according to the present invention.

FIG. 12 further shows a preferred embodiment of an I/Q data frame format in the above-mentioned solution. The I/Q baseband signal sampling data of a carrier frequency #m (m=1, 2, ... M) and of an antenna #n (n=1, 2, ... D) are arranged successively according to the sampling time sequence, and the I/Q baseband signal sampling values are successively arranged based on quadrature component sampling values and in-phase component sampling values. Hence, if a I/Q data frame consists of L number of I/Q data of one carrier frequency and one antenna at consecutive sampling time, then the total bit length of one I/Q data frame is 2WL. Since the GFP-T framing is performed in a byte alignment mode, L is a minimum value making WL/4 an integer. For example, if the sampling bit width of one RRU W=11, then L=4 is taken and the I/Q data frame length thereof is 11 bytes.

According to a fourth preferred solution of GFP-T frame-level multiplexing of baseband I/Q signals in the present invention, the baseband I/Q signals of the same carrier frequency, of the different antennas, and of the same type of radio interface protocols first form an I/Q data frame using a time division multiplexing mode, and then the baseband I/Q signals of different carrier frequencies and of the same type of radio interface protocols are multiplexed into the same GFP-T channel by the different superblocks mapped into the same GFP-T frame, and finally, the GFP-T channel bearing the baseband I/Q signals of different types of radio interface protocols are GFP-T frame-level multiplexed and then mapped into the same position of a CPRI frame to realize multiprotocol transmission. In this solution, regarding the mode in which the baseband I/Q signals of the same carrier frequency, of different antennas, and of the same type of radio interface protocols for forming an I/Q data frame using a time division multiplexing mode, it is the same as the I/Q data frame forming mode in the above-mentioned second preferred solution of GFP-T frame-level multiplexing of baseband I/Q signals.

Figure 13:
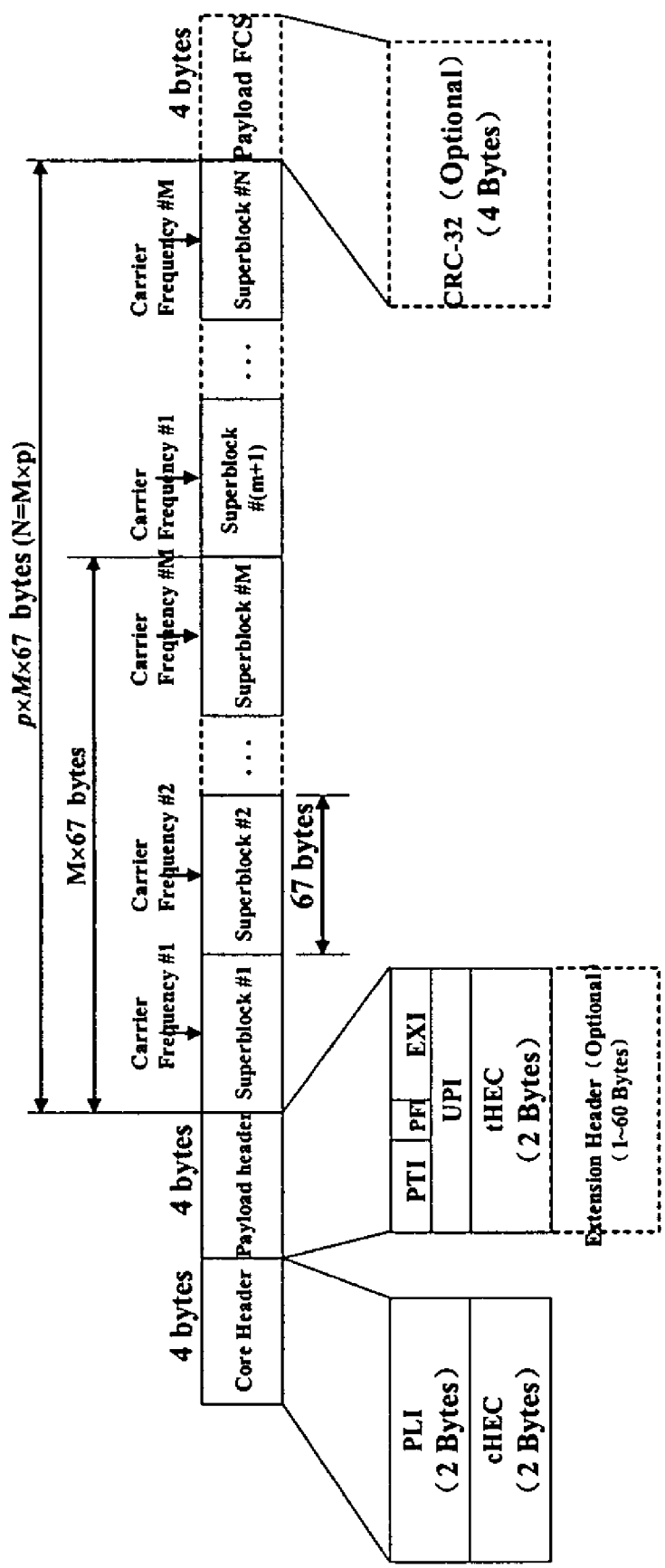
FIG. 13 is a schematic view showing using different super-blocks of a GFP-T frame payload portion to bear different carrier frequencies in a fourth preferred solution of the GFP-T frame-level multiplexing of baseband I/Q signals of a radio interface protocol according to the present invention.

As shown in FIG. 13, radio signals for M (M≧1) number of carrier frequencies are respectively transmitted by different superblocks using a time division multiplexing mode. In the payload portion of a GFP-T frame, the beginning M number of superblocks (having a length of M×67 bytes) respectively correspond to M number of different carrier frequencies and successively repeat p (p≧1) number of times, that is, the total number of superblocks of a GFP-T frame is N=pM. In this solution, M number of carrier frequencies time multiplex the transmission bandwidth of a GFP-T channel and the transmissions of radio signals for respective carrier frequencies are separate from each other.

Figure 14:
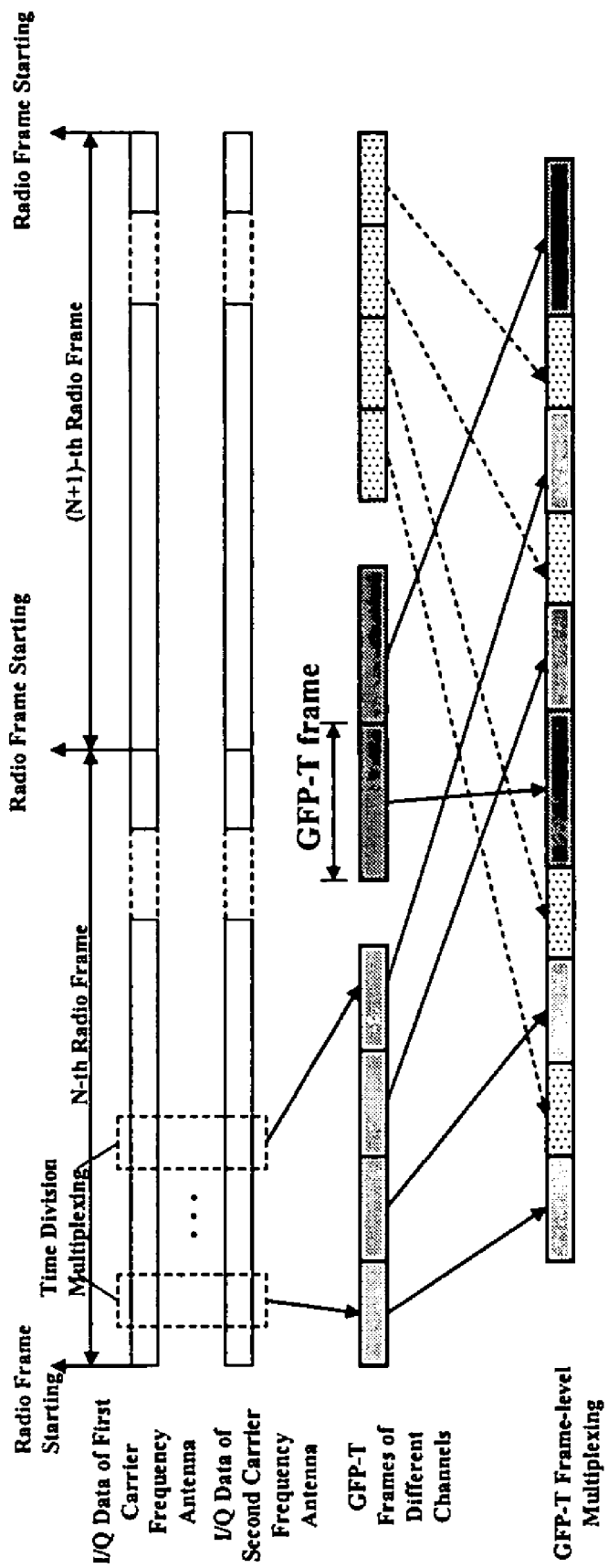
FIG. 14 is a general schematic view showing the GFP-T frame-level multiplexing of baseband I/Q signals of a radio interface protocol according to the present invention as shown in FIGS. 10-13.

FIG. 14 is a schematic view showing GFP-T frame-level multiplexing of baseband I/Q signals of a radio interface protocol based on the above solutions. Note that the baseband I/Q signals of antenna branches for different carrier frequencies and of the same radio interface protocol are time multiplexed based on the above solutions and then encapsulated in each GFP-T frame in the same GFP-T channel, whereas different GPF-T channels realize multiplexing in a GFP-T frame level. In addition, in the process of encapsulating, into a GFP-T frame, I/Q baseband signal data flows or data flows of the time multiplexed baseband I/Q signals, the GFP-T frame practically realizes the self-adaptive signal rate adaptation by dynamically inserting padding characters. The GFP-T frame is aligned based on characters and the padding characters are inserted into signal flows in bytes, while an I/Q data frame is the smallest unit of baseband I/Q signals flows with a byte as boundary, so the padding characters should be inserted between I/Q data frames.

1.2 CPRI Intra-Frame Multiplexing Solution of Baseband I/Q Signals of Radio Interface Protocol According to a first preferred solution of CPRI intra-frame multiplexing of baseband I/Q signals in the present invention, baseband I/Q signals of different antennas, of different carrier frequencies, and of same type of radio interface protocols are multiplexed in a time division multiplexing mode and then encapsulated in a GFP-T frame. Meanwhile, GFP-T channels bearing baseband I/Q signals of different types of radio interface protocols are mapped into different positions of a CPRI frame so as to realize multiprotocol transmission using the CPRI intra-frame multiplexing. The time division multiplexing mode of the baseband I/Q signals of different carrier frequencies, of different antennas, and of the same type of radio interface protocols can preferably still use the I/Q data frame format as shown in FIG. 10.

According to a second preferred solution of CPRI intra-frame multiplexing of baseband I/Q signals in the present invention, baseband I/Q signals of the same carrier frequency, of different antennas, and of the same type of radio interface protocols are multiplexed in a time division multiplexing mode and then encapsulated in a GFP-T frame. Meanwhile, GFP-T channels bearing baseband I/Q signals of different carrier frequencies and of different types of radio interface protocols are mapped into different positions of a CPRI frame, so as to realize multiprotocol transmission using the CPRI intra-frame multiplexing. The time division multiplexing mode of the baseband I/Q signals of the same carrier frequency, of different antennas, and of the same type of radio interface protocols can preferably still use the I/Q data frame format as shown in FIG. 11.

According to a third preferred solution of CPRI intra-frame multiplexing of baseband I/Q signals in the present invention, baseband I/Q signals of the same carrier frequency, of the same antenna, and of the same type of radio interface protocols are first encapsulated in a GFP-T frame. Meanwhile, GFP-T channels bearing baseband I/Q signals for different carrier frequencies of different antennas of different types of radio interface protocols are mapped into different positions of a CPRI frame, so as to realize multiprotocol transmission using the CPRI intra-frame multiplexing. The time division multiplexing mode of the baseband I/Q signals for the same carrier frequency of different antennas of the same type of radio interface protocols can preferably still use the I/Q data frame format as shown in FIG. 12.

According to a fourth preferred solution of CPRI intra-frame multiplexing of baseband I/Q signals in the present invention, baseband I/Q signals of the same carrier frequency, of different antennas, and of the same type of radio interface protocols are first time multiplexed to form an I/Q data frame, then the I/Q data frames of different carrier frequencies and of the same types of radio interface protocols are multiplexed on the same GFP-T channel by different superblocks mapped into the same GFP-T frame. Meanwhile, GFP-T channels bearing baseband I/Q signals of different types of radio interface protocols are mapped into different positions of a CPRI frame, so as to realize multiprotocol transmission using the CPRI intra-frame multiplexing. The time division multiplexing mode of the baseband I/Q signals of the same carrier frequency, of different antennas, and of the same type of radio interface protocols can preferably still use the I/Q data frame format as shown in FIG. 11.

Figure 15:
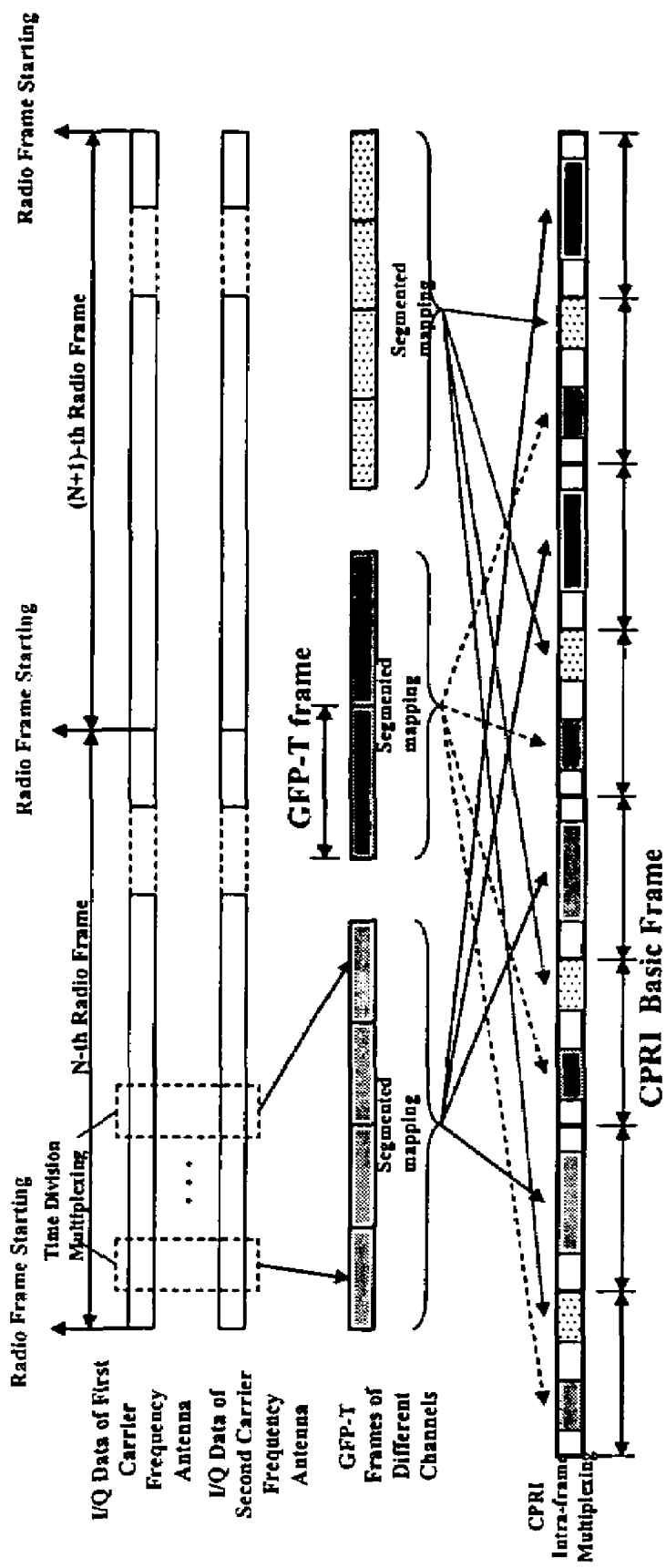
FIG. 15 is a general schematic view showing CPRI intra-frame multiplexing of baseband I/Q signals of a radio interface protocol according to the present invention.

FIG. 15 is a schematic view showing CPRI intra-frame multiplexing of baseband I/Q signals of a radio interface protocol based on the above solutions. It can be seen that, baseband I/Q signals of antenna branches for the different carrier frequencies and of the same radio interface protocol are time multiplexed based on the above solutions and then encapsulated in the GFP-T frames of the same GFP-T channel, while the different GFP-T channels are segmentedly mapped, respectively, to different positions of a CPRI link, so as to realize multiprotocol transmission using the CPRI intra-frame multiplexing. In addition, in the process of encapsulating baseband I/Q data flows or data flows of time multiplexed baseband I/Q signals in a GFP-T frame, the GFP-T actually realizes self-adaptive signal rate adaptation by dynamically inserting padding characters. The GFP-T frames are aligned based on characters and the padding characters are inserted into signal flows in bytes, while an I/Q data frame is the smallest unit of baseband I/Q signals with a byte as boundary, so the padding characters should be inserted between I/Q data frames.

1.3 Multiplexing Solutions of Other Non-Radio Interface Protocol Signals

As above-described, signals of non-radio interface protocol links comprise structured signals of constant-rate links such as E1/T1, STM1, etc., and structured non-constant-rate link signals such as Ethernet MAC frame signals, PPP/HDLC frame signals, etc. Regarding 100BASE-X Ethernet, said Ethernet MAC frame signals can be either signals which have been 4B/5B line coded or MAC frame signals which have not been 4B/5B line coded; regarding 1000BASE-X Ethernet, said Ethernet MAC frame signals can be either signals which have been 8B/10B line coded or MAC frame signals which have not been 8B/10B line coded.

According to the present invention, the signals of non-radio interface protocol links, comprising structured signals of constant-rate links such as E1/T1, STM1, etc., and structured non-constant-rate link signals such as Ethernet MAC frame signals, PPP/HDLC frame signals, etc., can be multiplexed using two modes and transmitted via the CPRI. One is the GFP-T frame-level multiplexing mode, that is, signals of each non-radio interface protocol link are first encapsulated, respectively, in a corresponding GFP-T frame, and GFP-T channels bearing the signals of corresponding non-radio interface protocol link are multiplexed in the GFP-T frame and then mapped into the same position of a CPRI frame to realize multiprotocol transmission; the other one is CPRI intra-frame multiplexing mode, that is, signals of each non-radio interface protocol link are first encapsulated, respectively, in a corresponding GFP-T frame, and GFP-T channels bearing the signals of the corresponding non-radio interface protocol link are mapped into different positions of the CPRI frame, so as to realize multiprotocol transmission using the CPRI intra-frame multiplexing.

1.4 GFP-T Frame-Level and CPRI Intra-Frame Mixed Multiplexing

Besides the above solutions of GFP-T frame-level multiplexing and CPRI intra-frame multiplexing of radio interface protocol signals and non-radio interface protocol signals, the present invention further allows of the GFP-T frame-level and CPRI intra-frame mixed multiplexing solution. That is, different GFP-T channels encapsulating radio interface protocol signals or non-radio interface protocol signals can be divided into a plurality of groups, wherein each group of said GFP-T channels is GFP-T frame-level multiplexed together and then different groups of GFP-T frame-level multiplexed signal flows are mapped into different positions of a CPRI frame, so as to further realize multiprotocol transmission in the CPRI intra-frame multiplexing.

2. GFP-T Frame Encapsulation of Client Signals

As aforesaid, the client signals including radio interface protocol signals and non-radio interface protocol signals can realize the GFP-T frame-level multiplexing. According to the present invention, this can be realized by introducing channel identifiers in a GFP-T extension header to identify different client signals.

As stated in the above, baseband I/Q signals of a radio interface protocol are non-structured client signals and it is necessary for the transmission protocol to provide frame timing information of the corresponding radio interface protocol, including start-up of a radio frame, base station frame number, etc. Usually, a radio interface protocol uses a radio frame as basic timing, wherein one type of radio interface protocols requires complete synchronization of respective base station timing (usually a system using a global timing such as GPS), namely that the respective base stations have the same radio frame timing, that is, the start-up time of the radio frame is the same, and the base station frame number is the same; the other type of radio interface protocols does not require the complete synchronization of the respective base station timing, namely allowing respective base stations to use their local radio frame timing, that is, the start-up time of the radio frame is different, and the base station frame number is also different. In a distributed base station, no matter which type of radio interface protocols is concerned, the RE needs to acquire radio frame timing provided by the REC. Regarding said second type of radio interface protocols, different carrier frequencies of the same base station probably use the different radio frame timing, but the same carrier frequency of different antennas has the same radio frame timing.

According to the present invention, the first method of transmitting frame timing information of baseband I/Q signals of a radio interface protocol is to use a GFP-T frame extension header to carry the frame timing information of the corresponding radio interface protocol, including the starting-position of a radio frame, base station frame number, etc. First of all, based on the foregoing multiplexing solutions of all the types of signals, the adopted multiplexing solutions of baseband I/Q signals of a radio interface protocol should cause each path of baseband I/Q signals encapsulated in the same GFP-T channel to have the same radio frame timing. Hence, so long as the GFP-T frame extension header carries the starting position of a radio frame, base station frame number and other frame timing information of at least one path of the baseband I/Q signals encapsulated in the GFP-T channel, the corresponding frame timing information can be restored at the opposite terminal.

Figure 16:
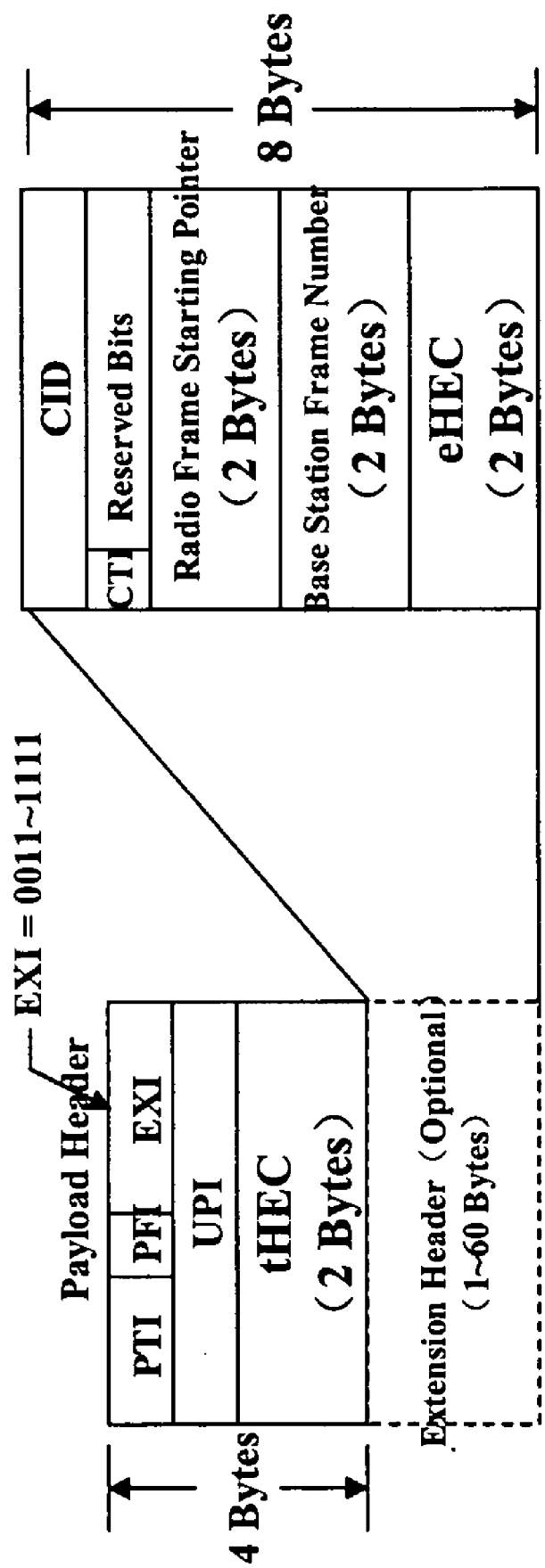
FIG. 16 is a schematic view showing a GFP frame Extension Header in one preferred solution of CPRI intra-frame multiplexing of baseband I/Q signals of a radio interface protocol as shown in FIG. 15 based on the present invention.

FIG. 16 shows a preferred embodiment of a GFP frame extension header based on the frame timing information transmission method. This extension header consists of one 8-bit channel identifier CID, one 1-bit channel type indicator CTI (other bits within the byte in which this bit is contained are reserved bits), a 16-bit radio frame starting pointer, and a 16-bit base station frame number and an extension header error control eHEC field. In order to indicate this new GFP extension header, it is necessary to assign a new value to a payload header EXI field. Since the values between 0011 and 1111 are not used, then any value between 0011 and 1111 can be taken to represent that this GFP frame contains an extension header as defined in the present invention.

In the GFP frame extension header shown in FIG. 16, the CID is for indicating different client signal channels to support the foregoing GFP-T frame-level multiplexing solutions; the radio frame starting pointer is for marking the radio frame starting position of the first path of baseband I/Q signals encapsulated in the GFP-T channel; the base station frame number is for marking the frame number corresponding to the radio frame after (or prior to) the radio frame starting position indicated by the radio frame starting pointer; the CTI is for indicating the type of the GFP-T channel, i.e., whether to be baseband I/Q signals of a radio interface protocol. If not, then the radio frame starting pointer and the base station frame number field will be neglected.

As stated in the above, in the preferred embodiment, the radio frame starting pointer is for marking the radio frame starting position of the first path of baseband I/Q signals encapsulated in the GFP-T channel. Although a plurality of indicating methods can be used, the value to which the radio frame starting pointer corresponds should correspond to an offset, with sampling bit width as unit, which starts from the first I/Q sampling value of the first path of baseband I/Q signals in the GFP-T channel in the GFP-T frame payload portion and ends with the I/Q sampling value at the sampling time to which the radio frame starting position corresponds. When the value of the radio frame starting pointer is zero, it represents that no radio frame starting point (a radio frame boundary) appears in the GFP-T frame.

Figure 17:
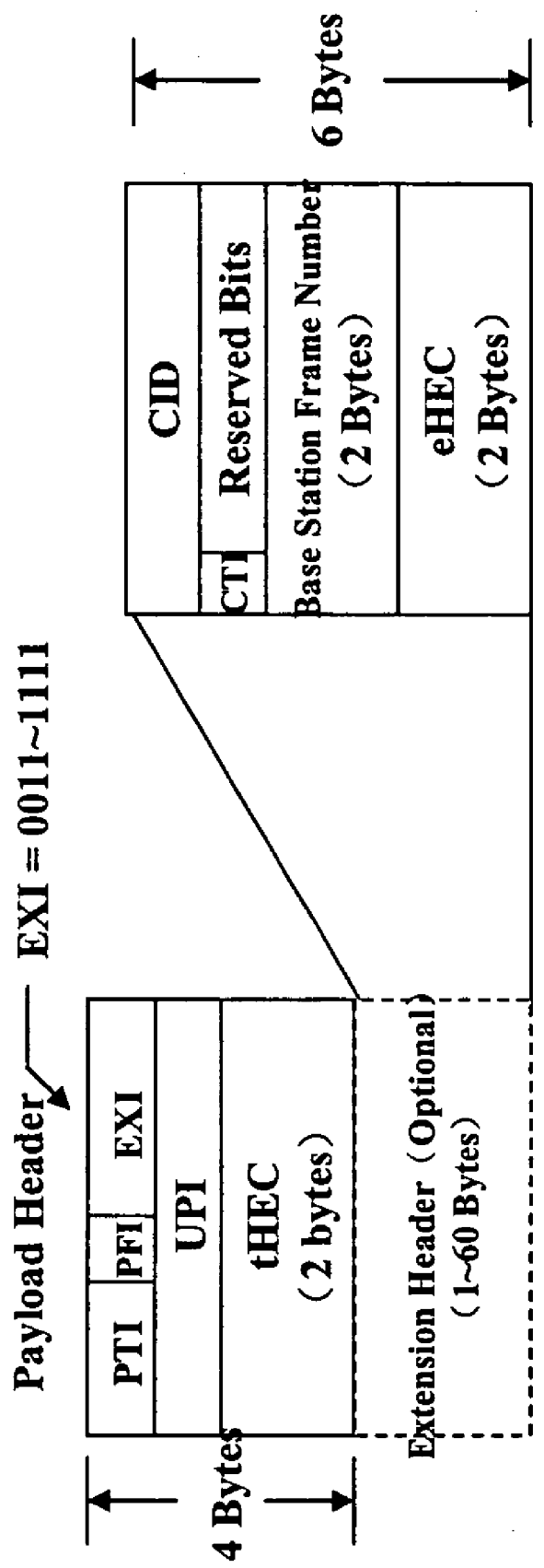
FIG. 17 is a schematic view of GFP frame Extension Header in another preferred solution of CPRI intra-frame multiplexing of baseband I/Q signals of a radio interface protocol as shown in FIG. 15 based on the present invention.

According to the present invention, the second method of transmitting frame timing information of baseband I/Q signals of a radio interface protocol is to use a control character of a 64B/65B code block as a frame boundary indicator of the corresponding baseband I/Q signals. FIG. 17 shows a preferred embodiment of a GFP frame extension header based on this frame timing information transmission method. This extension header consists of one 8-bit channel identifier CID, one 1-bit channel type indicator CTI (other bits within the byte in which this bit is contained are reserved bits), one 16-bit base station frame number and an extension header error control eHEC field. The CID is for indicating different client signal channels to support the foregoing GFP-T frame-level multiplexing solutions; the base station frame number is for marking the frame number corresponding to the radio frame after (or prior to) the radio frame starting position which is acquired based on the method; the CTI is for indicating the type of the GFP-T channel, i.e., whether it is baseband I/Q signals of a radio interface protocol. If not, then the base station frame number field will be neglected.

As stated in the above, most of the client signals concerned in the present invention are non-8B/10B coded signals. The current GFP-T is designed mainly aiming for the 8B/10B line coded signals. In the GFP specification, 4 least significant bits of a control character in 64B/65B code block are for transmitting control codes, while 4 most significant bits are for the indication of the subsequent control characters and the position identification of the control codes in the original 8B/10B code stream. In order to use the GFP-T to transmit non-8B/10B coded signals. The present invention re-defines the bits and usage of the control character in the 64B/65B code block. Meanwhile, in order to indicate that the GFP-T transmits GFP-T frames of non-8B/10B coded signals as newly defined in the present invention, when the payload type identifier (PTI) takes "0000", i.e., when the GFP-T frames are user data frames, a user payload identifier (UPI) takes any value in the range of "1111, 000~1111, 1110" so as to represent the special usage adopted in the present invention. Thus, when the payload type identifier (PTI) of one GFP frame is "000" and the user payload identifier (UPI) takes a specific value in the range of "1111, 000~1111, 1110" for indicating the special usage adopted in the present invention, it represents the client signals born by the GFP-T frames are non-8B/10B coded signals. Hence, the conversion from the 8B/10B coded signals to the 64B/65B coded ones is not performed and the client signals are directly transmitted, and additionally, the control character of the 64B/65B code block uses the definition and usage of the present invention.

Figure 18:
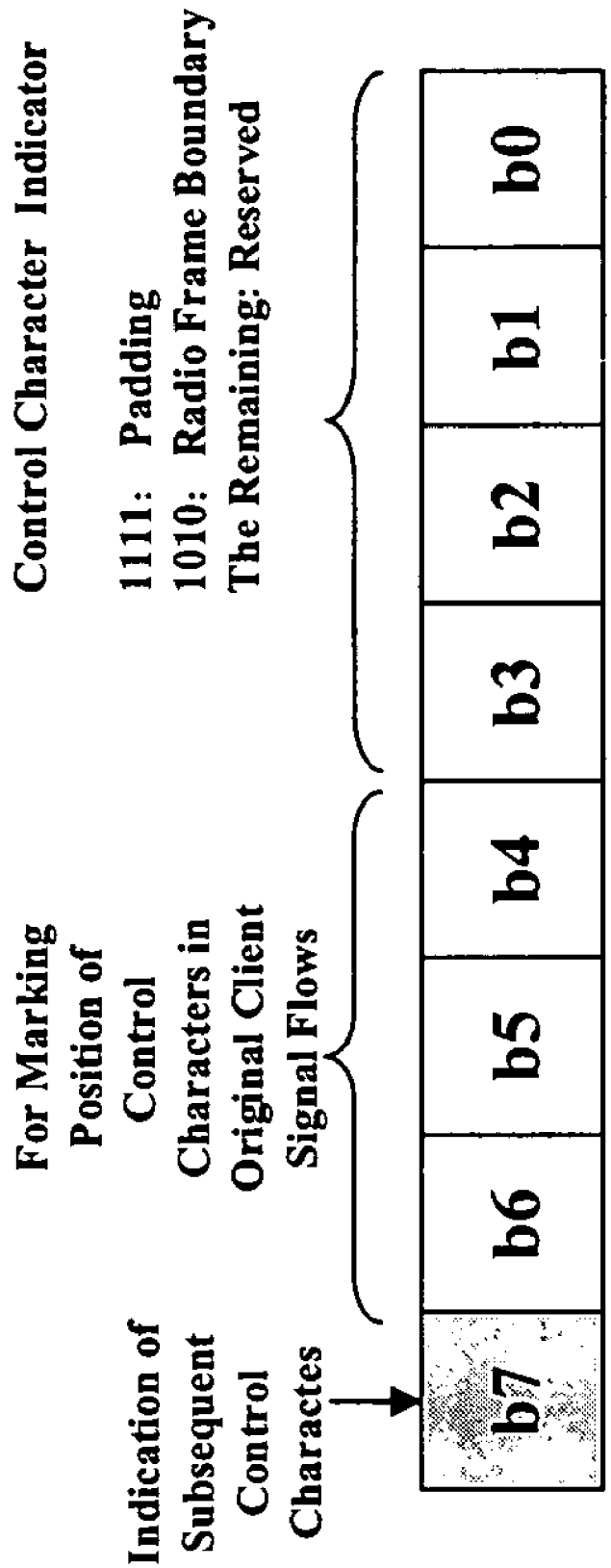
FIG. 18 is a schematic view showing the definition of control characters of 64B/65B code blocks of the present invention.

FIG. 18 shows the definition of a control character of a 64B/65B code block of a GFP-T frame for the transmission of baseband I/Q signals of a radio interface protocol and other non-8B/10B coded signals. Similar to the definition and usage in the original GFP specification, the most significant bit b7 is for indicating whether the subsequent bytes in the 64B/65B code block are control characters, and b4~b0 are for transmitting control codes themselves, but b6~b4 are for the special position marking function based on the present invention. What's different from the original GFP specification is that, since it is unnecessary to transmit specific 8B/10B control characters, the control characters are not for the restoration from the 64B/65B coded signals to the 8B/10B coded ones but they have a special usage.

Figure 19:
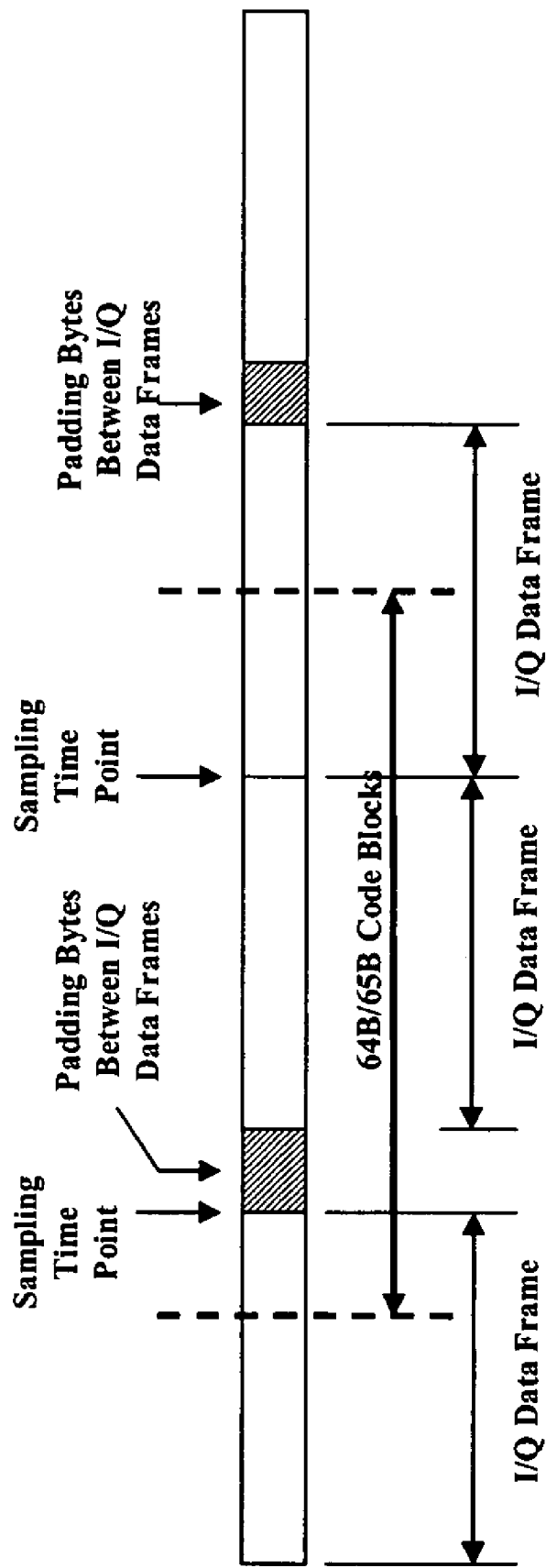
FIG. 19 is a schematic view showing the data constitution of 64B/65B code blocks.

According to the present invention, one mandatory control character is a padding character, and the other optional control character is a radio frame boundary indication character. As a non-limited exemplary example, FIG. 18 uses "1111" to represent a padding character and "1010" to represent a radio frame boundary indication character, wherein the padding character is used for a self-adaptive signal rate adaptation, while the radio frame boundary indication character is used for the above second method of transmitting frame timing information of baseband I/Q signals of a radio interface protocol. FIG. 19 shows the data constitution of a 64B/65B code block. It can be seen that, there may exist padding characters between I/Q data frames as above-stated, and since the I/Q data frames, as shown in FIGS. 10-12, are arranged in the sequence of the sampling time, one 64B/65B code block may contain padding characters or contain a plurality of sample starting time points (i.e., comprising I/Q data at a plurality of sampling time points). Since usually the sampling width is 4~20 bits (namely that the bit width of one I/Q data sampling value is 8~40 bits) whereas a 64B/65B code block comprises at most 8 user data characters, the number of the sampling points contained in one 64B/65B code block falls in the range of 0~8. Hence, one 64B/65B code block may contain zero or one radio frame boundary indication character, and when one radio frame boundary indication character is contained, it represents that the $X^{th}$ (wherein X is a value corresponding to b6~b4 bits) sampling starting time counted from the first sampling starting time contained in the 64B/65B code block is the boundary (radio frame starting position) of the corresponding radio frame. The frame number to which the radio frame after (prior to) the radio frame starting position corresponds is given by the base station frame number field of the GFP-T frame extension header.

3. Mapping of GFP-T Frames into CPRI

The mapping of GFP-T frames to the CPRI means different GFP-T channels bearing client signals are respectively segmentedly mapped into different positions of a CPRI link so as to realize multiprotocol transmission using the CPRI intra-frame multiplexing, wherein the GFP-T frame are typically mapped into the portion of a CPRI frame excluding control words. According to the present invention, one solution is still to use AxC containers to directly bear baseband I/Q signals of WCDMA according to the prior CPRI specification, whereas the bandwidth of the CPRI frame excluding control words and AxC containers bearing baseband I/Q signals of WCDMA is for transmitting the client signals encapsulated in a GFP-T frame and including other radio interface protocol signals and non-radio interface protocol signals based on the present invention; another solution is to transmit all the signals of radio interface protocols including WCDMA and signals of non-radio interface protocols by using the method set forth in the present invention, wherein the usage of the control words of the CPRI frame including WCDMA synchronization information still follow the prior CPRI specification.

Figure 7:
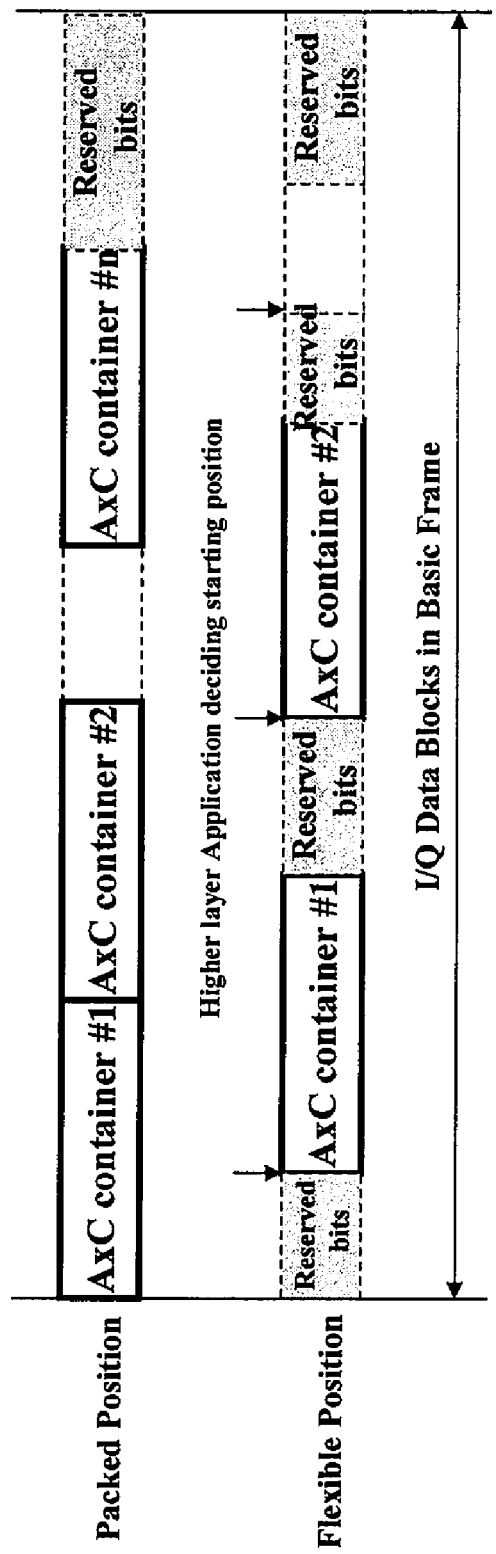
FIG. 7 is a schematic view of two modes by which an AxC container is mapped into a basic frame.
Figure 8:
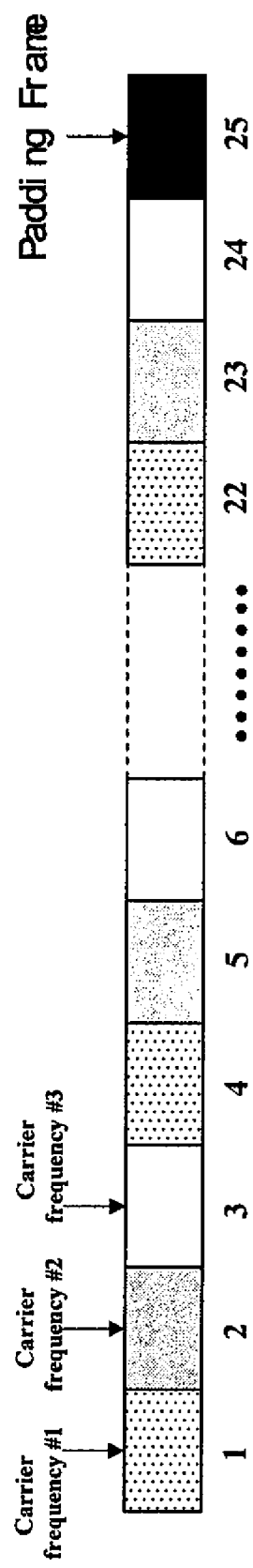
FIG. 8 is a schematic view showing the transmission of a three-carrier frequency CDMA2000 1X based on a CPRI in the prior art.
Figure 9:
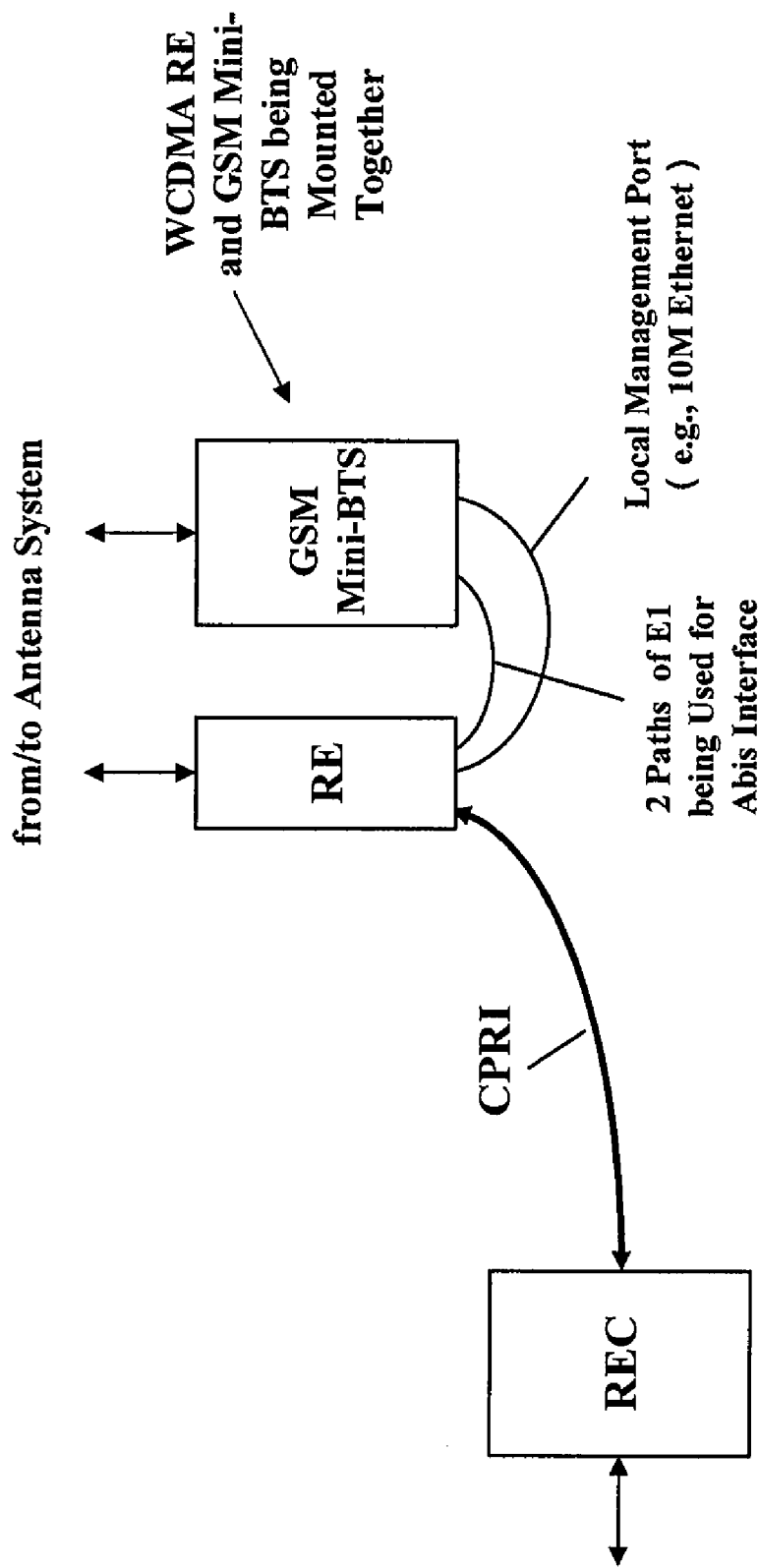
FIG. 9 is a schematic view showing the application of a CPRI to the case where WCDMA RE and GSM Mini-BTS are co-located.

According to the present invention, the mapping of GFP-T frames of different GFP-T channels into CPRI can similarly adopt two modes as shown in FIG. 7, i.e. packed position and flexible position. In addition, besides the mapping into different positions of a CPRI basic frame, said mapping mode also allows of the scheduling based on a basic frame as unit, namely that GFP-T frames of different GFP-T channels may be mapped into the same segment position of different CPRI basic frames. For example, GFP-T frames of one GFP-T channel may be mapped into one segment position of CPRI basic frames with odd numbers, while the GFP-T frames of another GFP-T channel may be mapped into the same position of the CPRI basic frames with even numbers.

4. Multiprotocol Signal Transmission Process

Figure 20A:
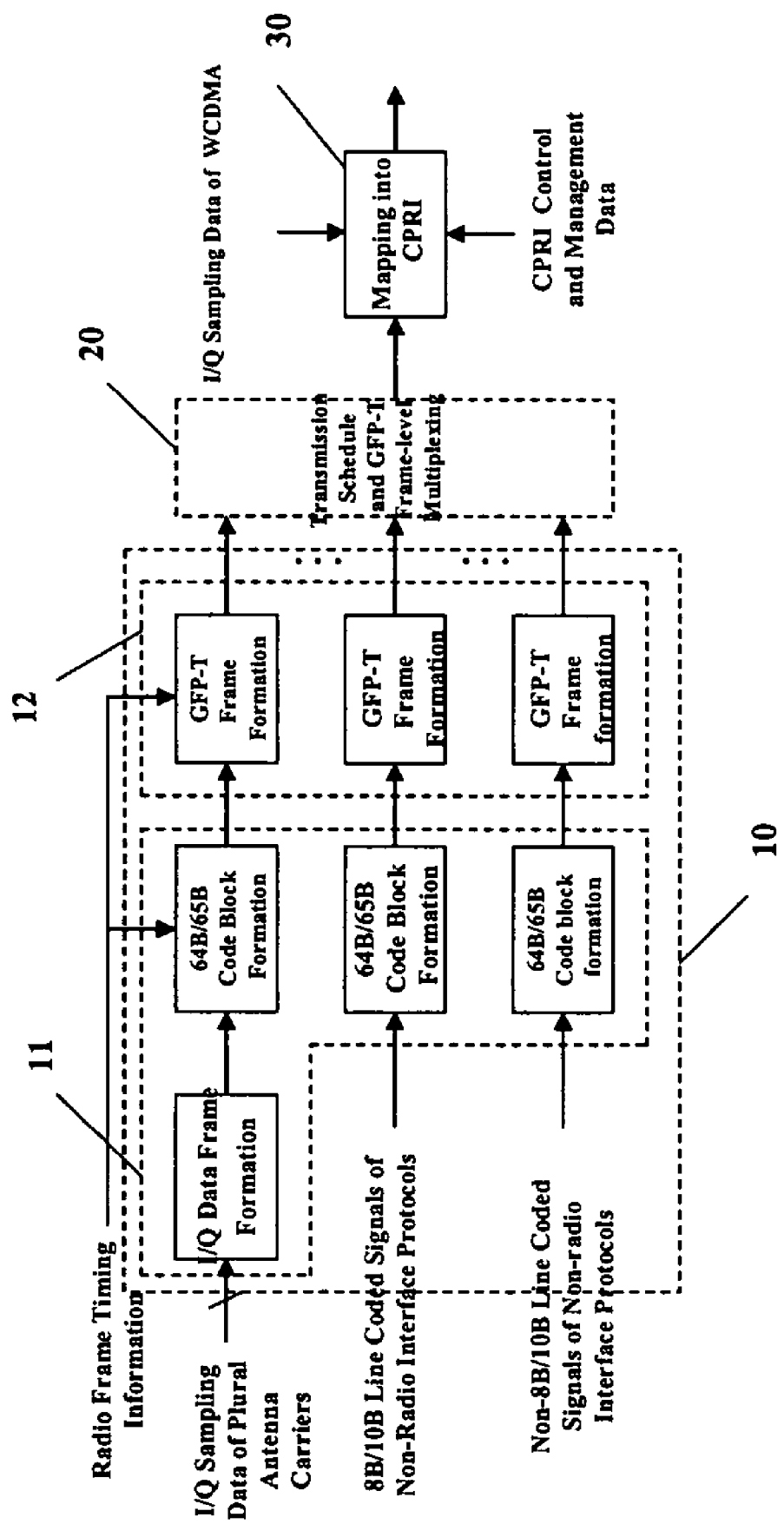
FIG. 20($a$) is a schematic view showing the structure of a transmitting terminal system for performing client signal transmission using the method of transmitting multiprotocol client signals in a distributed base station subsystem of the present invention.
Figure 20B:
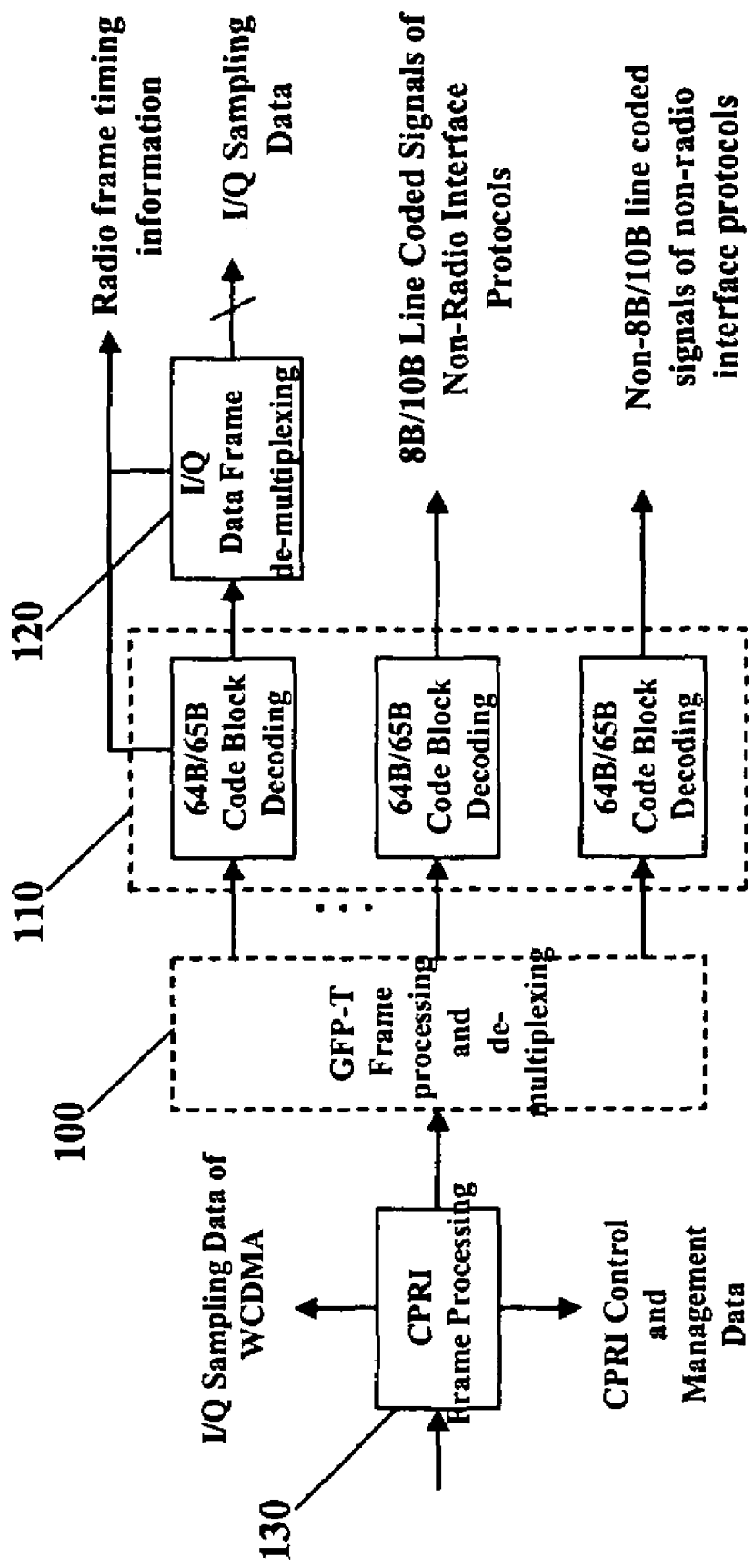

FIG. 20(*a*) shows the structure of a transmitting terminal system based on the present invention. It can be seen that, I/Q sampling data of multiple antenna carriers are time multiplexed according to the foregoing method and form I/Q data frame through an I/Q data frame forming unit 11, and then form 64B/65B code blocks through a 64B/65B code block forming unit 11 and further form the corresponding GFP-T frames through a GFP-T frame forming unit 12, wherein the definition and usage of the control characters in the 64B/65B code blocks adopt the foregoing method set forth in the present invention, and radio frame timing information, etc. is also carried by GFP-T frames according to the foregoing method; 8B/10B line coded signals of non-radio interface protocols are converted into 64B/65B line coded ones according to the GFP-T specification and then form 64B/65B code blocks to constitute the corresponding GFP-T frames; non-8B/10B line coded signals of non-radio interface protocols do not perform the conversion from the 8B/10B line coded signals to the 64B/65B line coded ones but directly form 64B/65B code blocks to further constitute corresponding GFP-T frames. GFP-T signal flows of various types of client signals are multiplexed together in GFP-T frame level after the transmission scheduling by a transmission scheduling and GFP-T frame-level multiplexing unit 20, and finally mapped into specific positions in a CPRI frame through the CPRI mapping unit 30. In addition, I/Q signals of WCDMA can also be transmitted according to the prior CPRI protocol, and CPRI control, management and synchronization data, etc. are transmitted via a control word channel according to the prior CPRI protocol. As aforesaid, in the structure of the transmitting terminal system based on the present invention as shown in FIG. 20(*a*), it is also possible for the GFP-T signal flows of the various types of client signals not to perform GFP-T frame-level multiplexing, and they are directly mapped into different positions of a CPRI frame so as to realize multiprotocol transmission using the CPRI intra-frame multiplexing.

FIG. 20(*b*) shows the structure of a receiving terminal system based on the present invention. It can be seen that, the receiving terminal is an inverse process of the transmitting terminal as shown in FIG. 20(*a*). First, a CPRI frame processing unit 130 carries out CPRI frame processing and separates I/Q signals of WCDMA, CPRI control, management and synchronization data and CFP-T frame signal flows, and then a GFP-T frame processing and de-multiplexing unit 100 carries out GFP-T frame processing and separates signal flows from respective GFP-T channels, and the 64B/65B code blocks in the respective GFP-T channels extract respective client signals through a 64B/65B decoding unit 110, wherein radio protocol signal flows are further separated into I/Q signal flows of respective antenna carriers through an I/Q data frame de-multiplexing unit 120, while the corresponding radio frame synchronization information, etc. is extracted from a corresponding GFP-T frame.

Furthermore, the present invention further relates to an apparatus for realizing multiprotocol client signals transmission in a distributed base station subsystem of a radio mobile communication system. This apparatus comprises a transmitting terminal equipment and a receiving terminal equipment, as above-described in the present invention, for realizing multiprotocol client signal transmission between a remote radio unit and a primary baseband processing unit in a distributed base station system using the foregoing method of the present invention. Other composite units of the apparatus and working modes thereof are publicly known by those skilled in the art and here it is unnecessary to go into details.

The present invention is described in detail by reference to the modes for carrying out the invention. However, it is known by those skilled in the art that, the protection scope of the present invention is not limited by the aforesaid modes but various modifications or transformations can be made under the premise of not departing from the basic principles and spirit of the present invention. For instance, the steps of respective methods completed in the above modes of the present invention can be realized using software, hardware or their combination. All in all, the protection scope of the present invention is defined by the enclosed claims.

What is claimed is:

1. A method of realizing multiprotocol client signal transmission by a distributed base station subsystem of a radio mobile communication system, comprising the steps of:
   encapsulating client signals by a GFP-T frame;
   and mapping said GFP-T frame into a common public radio interface CPRI link to realize the transmission of client signals,
   wherein the step of encapsulating client signals by a GFP-T frame comprising:
   baseband I/Q signals of the same carrier frequency, of different antennas, and of the same types of radio interface protocols are time multiplexed and forming an I/O data frame; and
   I/O data frames of different carrier frequencies and of the same types of radio interface protocols are multiplexed on the same GFP-T channel by being mapping into different superblocks of the same GFP-T frame.

2. A method of realizing multiprotocol client signal transmission by a distributed base station subsystem as defined in claim 1, wherein, said client signals are one of the following: baseband I/Q signals of WCDMA supported by CPRI protocol, baseband I/Q signals of radio interface protocols other than WCDMA.

3. A method of realizing multiprotocol client signal transmission by a distributed base station subsystem as defined in claim 2, wherein,
   different GFP-T channels are GFP-T frame-level multiplexed and then mapped into the same position of a CPRI frame to realize multiprotocol transmission.

4. A method of realizing multiprotocol client signal transmission by a distributed base station subsystem as defined in claim 3, wherein,
   in the step of encapsulating data flows of time multiplexed baseband I/Q signals in a GFP-T frame, GFP-T realizes self-adaptive signal rate adaptation by dynamically inserting padding characters, and wherein the padding characters are inserted between I/Q data frames.

5. A method of realizing multiprotocol client signal transmission by a distributed base station subsystem as defined in claim 2, wherein,
   different GFP-T channels encapsulating client signals are divided into a plurality of groups, each group of said GFP-T channels are GFP-T frame-level multiplexed together; and
   different groups of GFP-T frame-level multiplexed signal flows are mapped into different positions of a CPRI frame so as to realize multiprotocol transmission through CPRI intra-frame multiplexing.

6. A method of realizing multiprotocol client signal transmission by a distributed base station subsystem as defined in claim 2, wherein an extension header of a GFP-T frame transmits frame timing information of baseband I/Q signals of a radio interface protocol so that client signals are encapsulated in a GFP-T frame.

7. A method of realizing multiprotocol client signal transmission by a distributed base station subsystem as defined in claim 6, wherein the extension header of a GFP-T frame carries frame timing information of at least one path of baseband I/Q signals encapsulated in the GFP-T frame channel.

8. A method of realizing multiprotocol client signal transmission by a distributed base station subsystem as defined in claim 7, wherein the extension header of said GFP-T frame consists of one 8-bit channel identifier CID for indicating different client signal channels, one 1-bit channel type indicator CTI, a 16-bit radio frame staffing pointer for marking the radio frame staffing position of the first path of baseband I/Q signals encapsulated in the GFP-T channel, an 16-bit base station frame number for marking the frame number corresponding to the radio frame after or prior to the radio frame starting position indicated by the radio frame staffing pointer, and an extension header error control eHEC field for assigning any value between 0011~1111 to a payload header EXI field to represent the GFP-T frame contains said extension header of the GFP frame, wherein other bits in the byte in which said channel type indicator CTI is contained are reserved bits, and wherein said CTI is for indicating the type of the GFP-T channel to show whether client signals are baseband I/Q signals of a radio interface protocol, and if not, then the radio frame starting pointer and the base station frame number field will be neglected.

9. A method of realizing multiprotocol client signal transmission by a distributed base station subsystem as defined in claim 6, wherein the extension header of said GFP-T frame consists of 8-bit channel identifier CID for indicating different client signal channels, one 1-bit channel type indicator CTI, an 16-bit base station frame for marking the frame number corresponding to the radio frame after or prior to the obtained baseband I/Q signal radio frame starting position, and an extension header error control cHEC field, wherein other bits in the byte in which said CTI is contained are reserved bits, and wherein said CTI is for indicating the type of the GFP-T channel to show whether the client signals are baseband I/Q signals of a radio interface protocol, and if not, then the base station frame number field will be neglected.

10. A method of realizing multiprotocol client signal transmission by a distributed base station subsystem as defined in claim 9, wherein a control characters of the 64B/65B code block is used as a frame boundary indicator of the corresponding baseband I/Q signals, and wherein, when a payload type identifier PTI of one GFP frame is "000" and a user payload type identifier UPI takes a specific value in the range of "1111, 000~1111, 1110", it represents the client signals born by the GFP-T frame are not 8B/10B coded signals, so that the conversion from the 8B/10B coded signals to the 64B/65B ones is not performed and the client signals are directly transmitted.

11. A method of realizing multiprotocol client signal transmission by a distributed base station subsystem as defined in claim 10, wherein the most significant bit b7 of a control character of the 64B/65B code block is for indicating whether the subsequent bytes in the 64B/65B code block are control characters, and b4~b0 are for transmitting control codes themselves, b6~b4 are for marking the position of the control character in the original client signal flow, wherein the control character is not for the restoration from the 64B/65B coded signal to the 8B/10B coded ones.

12. A method of realizing multiprotocol client signal transmission by a distributed base station subsystem as defined in claim 11, wherein one mandatory control character is a padding character and another optional control character is a radio frame boundary indicating character.

13. A method of realizing multiprotocol client signal transmission by a distributed base station subsystem as defined in claim 12, wherein the padding character is represented by "1111" and the radio frame boundary indicating character is represented by "1010", and wherein, the padding character is for the self-adaptive signal rate adaptation, and the radio frame boundary indicating character is for the transmission of frame timing information of baseband I/Q signals of a radio interface protocol.

14. A method of realizing multiprotocol client signal transmission by a distributed base station subsystem as defined in claim 1, wherein, different GFP-T channels are respectively mapped segmentedly into different positions of a CPRI link so as to realize multiprotocol transmission using CPRI intra-frame multiplexing.

15. A method of realizing multiprotocol client signal transmission by a distributed base station subsystem as defined in claim 14, wherein said mapping respectively and segmentedly said different GFP-T channels into different positions of the CPRI link is mapping said GFP-T frame into the portion of the CPRI frame excluding control words.

16. A method of realizing multiprotocol client signal transmission by a distributed base station subsystem as defined in claim 15, wherein the mapping of GFP-T frames of different GFP-T channels into CPRI can adopt a packed position mode or a flexible position mode, wherein in the packed position mode, AxC containers are consecutively in order mapped into a basic frame and the remaining bits are treated as reserved bits, while in the flexible position mode, the AxC containers are mapped into a basic frame according to a position specified in application and the remaining bits unoccupied by the AxC containers in the frame are reserved bits, and wherein the GFP-T frames of said different GPF-T channels can be mapped into different positions of a CPRI basic frame or mapped into the same segment position of different CPRI basic frames.

17. A method of realizing multiprotocol client signal transmission by a distributed base station subsystem as defined in claim 15 or 16, wherein AxC containers are used to directly bear baseband I/Q signals of WCDMA according to the prior CPRI specification, while the bandwidth of the CPRI frame excluding the control words and the AxC containers bearing the baseband I/Q signals of WCDMA is for transmitting said client signals encapsulated in the GFP-T frame.

18. A method of realizing multiprotocol client signal transmission by a distributed base station subsystem as defined in claim 15 or 16, wherein signals of all the radio interface protocols including WCDMA are transmitted through the steps of encapsulating said signals in a GFP-T frame and mapping respectively and segmentedly different GFP-T channels into the CPRI link, and the usage of the control words of the CPRI frame including WCDMA synchronization information still follows the prior CPRI specification.

19. A method of realizing multiprotocol client signal transmission by a distributed base station subsystem as defined in claim 14, wherein,
in the step of encapsulating data flows of time multiplexed baseband I/Q signals in a GFP-T frame, GFP-T realizes self-adaptive signal rate adaptation by dynamically inserting padding characters, and wherein the padding characters are inserted between I/Q data frames.

20. A method of realizing multiprotocol client signal transmission by a distributed base station subsystem as defined in claim 1, wherein,
radio signals for M number of carrier frequencies are respectively transmitted by different superblocks of a payload portion of a GFP-T frame using a time division multiplexing mode, the beginning M number of superblocks respectively corresponding to M number of different carrier frequencies, and successively repeating p number of times, the total number of superblocks of one GFP-T frame being N=PM, and M number of carrier frequencies time multiplex the transmission bandwidth of one GFP-T channel, and the radio signals for respective carrier frequencies being transmitted separately from each other, wherein M and p are integers larger than or equal to 1.

21. A transmitting terminal equipment for realizing transmission of multiprotocol client signals in a distributed base station subsystem of a radio mobile communication system, comprising:
GFP-T framing and encapsulating unit for forming the client signals to be transmitted into a GFP-T frame; and
CPRI mapping unit for mapping said GFP-T frame into a CPRI frame, so as to realize transmission of client signals,
wherein the GFP-T framing and encapsulating unit (10) further for time multiplexing baseband I/O signals of the same carrier frequency, of different antennas, and of the same types of radio interface protocols and forming an I/O data frame; and
multiplexing I/O data frames of different carrier frequencies and of the same types of radio interface protocols on the same GFP-T channel by mapping them into different superblocks of the same GFP-T frame.

22. A transmitting terminal equipment as defined in claim 21, further comprising:
GFP-T frame-level multiplexing unit disposed between said GFP-T framing and encapsulating unit and said CPRI mapping unit, for causing GFP-T signal flows of the client signals received by said GFP-T framing and encapsulating unit to realize GFP-T frame-level multiplexing through transmission scheduling.

23. A transmitting terminal equipment as defined in claim 21 or 22, wherein said client signals comprise baseband I/Q signals supported by the radio interface protocols other than CPRI protocol.

24. A transmitting terminal equipment as defined in claim 21 or 22, wherein said GFP-T framing and encapsulating unit comprises:
64B/65B encoding unit for forming respective paths of client signals into 64B/65B code blocks;
I/Q data frame multiplexing unit for forming the baseband I/Q signals supported by said other radio interface protocols into an I/Q data frame; and
GFP-T frame forming unit for forming said formed 64B/65B code blocks into a GFP-T frame, respectively.

25. An apparatus for realizing transmission of multiprotocol client signals in a distributed base station subsystem in a radio mobile communication system, comprising the transmitting terminal equipment as defined in claim 21 and a receiving terminal equipment for realizing transmission of multiprotocol client signals in a distributed base station subsystem of a radio mobile communication system, the receiving terminal equipment comprising:
CPRI frame processing unit for processing a CPRI frame to separate I/Q signals of WCDMA, CPRI control, management and synchronization data and GFP-T frame signal flows;
GFP-T frame processing and de-multiplexing unit for processing a GFP-T frame and separating signal flows of respective GFP-T channels;
64B/65B decoding unit for extracting respective paths of client signals from the 64B/65B code blocks in the respective GFP-T channels; and
I/Q data frame de-multiplexing unit for separating I/Q signal flows of respective antenna carriers from signal flows of a radio interface protocol, the corresponding radio frame synchronization and other information being extracted from corresponding GFP-T frame, wherein in the GFP-T frame signal flows, baseband I/O signals of the same carrier frequency, of different antennas, and of the same types of radio interface protocols are time multiplexed and forming an I/O data frame; and I/O data frames of different carrier frequencies and of the same types of radio interface protocols are multiplexed on the same GFP-T channel by being mapping into different superblocks of the same GFP-T frame.

26. A receiving terminal equipment for realizing transmission of multiprotocol client signals in a distributed base station subsystem of a radio mobile communication system, comprising:

CPRI frame processing unit for processing a CPRI frame to separate I/Q signals of WCDMA, CPRI control, management and synchronization data and GFP-T frame signal flows;

GFP-T frame processing and de-multiplexing unit (for processing a GFP-T frame and separating signal flows of respective GFP-T channels;

64B/65B decoding unit (110) for extracting respective paths of client signals from the 64B/65B code blocks in the respective GFP-T channels; and I/Q data frame de-multiplexing unit for separating I/Q signal flows of respective antenna carriers from signal flows of a radio interface protocol, the corresponding radio frame synchronization and other information being extracted from corresponding GFP-T frame, wherein in the GFP-T frame signal flows, baseband I/O signals of the same carrier frequency, of different antennas, and of the same types of radio interface protocols are time multiplexed and forming an I/O data frame; and I/O data frames of different carrier frequencies and of the same types of radio interface protocols are multiplexed on the same GFP-T channel by being mapping into different superblocks of the same GFP-T frame.

27. A receiving terminal equipment as defined in claim 26, wherein said client signals comprise baseband I/Q signals supported by radio interface protocols other than CPRI protocol.

* * * * *

UNITED STATES PATENT AND TRADEMARK OFFICE
CERTIFICATE OF CORRECTION

PATENT NO. : 7,656,897 B2
APPLICATION NO. : 11/397949
DATED : February 2, 2010
INVENTOR(S) : Sheng Liu It is certified that error appears in the above-identified patent and that said Letters Patent is hereby corrected as shown below:

Column 17, Line 11
"baseband I/O signals of the same carrier frequency, of different antennas, and of the same types of radio interface protocols are time multiplexed and forming an I/O date frame; and I/O data frames of different carrier frequencies and of the" should read -- baseband I/Q signals of the same carrier frequency, of different antennas, and of the same types of radio interface protocols are time multiplexed and forming an I/Q date frame; and I/Q data frames of different carrier frequencies and of the --.

Column 17, Line 66
"indicator CTI, a 16-bit radio frame staffing pointer for marking the radio frame staffing position of the first path of baseband I/Q signals encapsulated in the GFP-T channel, an 16-bit base station frame number for marking the frame number corresponding to the radio frame after or prior to the radio frame starting position indicated by the radio frame staffing pointer," should read -- indicator CTI, a 16-bit radio frame starting pointer for marking the radio frame starting position of the first path of baseband I/Q signals encapsulated in the GFP-T channel, an 16-bit base station frame number for marking the frame number corresponding to the radio frame after or prior to the radio frame starting position indicated by the radio frame starting pointer, --.

Column 20, Line 12
"further for time multiplexing baseband I/O signals of the same carrier frequency, of different antennas, and of the same types of radio interface protocols and forming an I/O data frame; and multiplexing I/O data frames of different carrier frequencies" should read -- further for time multiplexing baseband I/Q signals of the same carrier frequency, of different antennas, and of the same types of radio interface protocols and forming an I/Q data frame; and multiplexing I/Q data frames of different carrier frequencies --.

Column 21, Line 2
"baseband I/O signals of the same carrier frequency, of different antennas, and of the same types of radio interface protocols are time multiplexed and forming an I/O data frame; and I/O data frames of different carries frequencies and of the" should read -- baseband I/Q signals of the same carrier frequency, of different antennas, and of the same types of radio interface protocols are time multiplexed and forming an I/Q data frame; and I/Q data frames of different carries Signed and Sealed this Ninth Day of November, 2010

David J. Kappos
*Director of the United States Patent and Trademark Office* frequencies and of the --.

Column 22, Line 10
"baseband I/O signals of the same carrier frequency, or different antennas, and of the same types of radio interface protocols are time multiplexed and forming an I/O data frame; and I/O data frames of different carrier frequencies and of the" should read -- baseband I/Q signals of the same carrier frequency, or different antennas, and of the same types of radio interface protocols are time multiplexed and forming an I/Q data frame; and I/Q data frames of different carrier frequencies and of the --.

UNITED STATES PATENT AND TRADEMARK OFFICE
CERTIFICATE OF CORRECTION

PATENT NO. : 7,656,897 B2  Page 1 of 1
APPLICATION NO. : 11/397949
DATED : February 2, 2010
INVENTOR(S) : Sheng Liu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Thirtieth Day of November, 2010

David J. Kappos
*Director of the United States Patent and Trademark Office*